United States Patent
Matsui et al.

(10) Patent No.: US 12,181,707 B2
(45) Date of Patent: Dec. 31, 2024

(54) MULTI-CORE OPTICAL FIBER AND DESIGN METHOD

(71) Applicant: NIPPON TELEGRAPH AND TELEPHONE CORPORATION, Tokyo (JP)

(72) Inventors: Takashi Matsui, Musashino (JP); Kazuhide Nakajima, Musashino (JP); Taiji Sakamoto, Musashino (JP); Yuto Sagae, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 18/020,539

(22) PCT Filed: Aug. 12, 2020

(86) PCT No.: PCT/JP2020/030731
§ 371 (c)(1),
(2) Date: Feb. 9, 2023

(87) PCT Pub. No.: WO2022/034662
PCT Pub. Date: Feb. 17, 2022

(65) Prior Publication Data
US 2023/0341618 A1    Oct. 26, 2023

(51) Int. Cl.
*G02B 6/02* (2006.01)
*G02B 27/00* (2006.01)

(52) U.S. Cl.
CPC ...... *G02B 6/02042* (2013.01); *G02B 6/02028* (2013.01); *G02B 27/0012* (2013.01)

(58) Field of Classification Search
CPC .................................. G02B 6/02042
See application file for complete search history.

(56) References Cited

U.S. PATENT DOCUMENTS

2013/0129292 A1* 5/2013 Sasaoka .............. G02B 6/4246
385/126
2014/0334789 A1* 11/2014 Matsuo ............... G02B 6/0365
385/126

(Continued)

FOREIGN PATENT DOCUMENTS

JP       2013-88457 A  *  5/2013
JP       6560806 B1      8/2019

(Continued)

OTHER PUBLICATIONS

S. Nozoe et al. Ultra-low crosstalk 125-um-cladding four-hole four-core fibers fabricated by the over-cladding bundled rods method. Journal of Lightwave Technology, vol. 37 no. 21, pp. 5600-5608, Nov. 1, 2019 (https://doi.org/10.1109/JLT.2019.2935546) (Year: 2019).*

(Continued)

*Primary Examiner* — Michael Stahl

(57) ABSTRACT

The present invention is to provide a multi-core optical fiber that can expand its transmission wavelength band, and extend its transmission distance by reducing crosstalk, and also provide a method for designing the multi-core optical fiber. A multi-core optical fiber according to the present invention includes: four cores that are arranged in a square lattice pattern in a longitudinal direction; and a cladding region that is formed around the outer peripheral portions of the cores and has a lower refractive index than the cores, the absolute value of the relative refractive index difference between the cores and the cladding region being represented by A. In the multi-core optical fiber, the diameter of the cladding region is 125±1 μm, the cutoff wavelength is 1.45 μm or shorter, the mode field diameter MFD at a wavelength of 1.55 μm is 9.5 to 10.0 μm, the bending loss at a wavelength of 1.625 μm and with a bending radius of 30 mm (Continued)

is 0.1 dB/100 turns or smaller, and the inter-core crosstalk at the wavelength of 1.625 μm is −47 dB/km or smaller.

7 Claims, 17 Drawing Sheets

(56) References Cited

U.S. PATENT DOCUMENTS

| | | |
|---|---|---|
| 2016/0187576 A1 | 6/2016 | Sasaki et al. |
| 2022/0003920 A1 | 1/2022 | Matsui et al. |
| 2022/0120961 A1 | 4/2022 | Matsui et al. |

FOREIGN PATENT DOCUMENTS

| | | |
|---|---|---|
| JP | 2020-115191 A | 7/2020 |
| WO | WO-2015/133407 A1 | 9/2015 |

OTHER PUBLICATIONS

T. Matsui et al., "Applicability of Step-Index Type Standard Cladding Multi-core Fiber to Full-Band Transmission", in Proc. ECOC, Dublin, Ireland, Sep. 2019, M.1.D.3.

T. Matsui et al., "Design of multi-core fiber in 125μm cladding diameter with full compliance to conventional SMF", in Proc. ECOC, Valencia, Spain, Sep. 2015, We.4.3.

Matsui Takashi et al.: "Design and Applicability of Multi-Core Fibers With Standardn Cladding Diameter", Journal of Lightwave Technology, IEEE, USA, val. 38, No. 21, Jun. 25, 2020 (Jun. 25, 2020), pp. 6065-6070, XP011813701, ISSN: 0733-8724, DOI: 10.1109/JL T.2020.3004824 [retrieved on Oct. 7, 2020] * p. 6068-p. 6069 *.

* cited by examiner

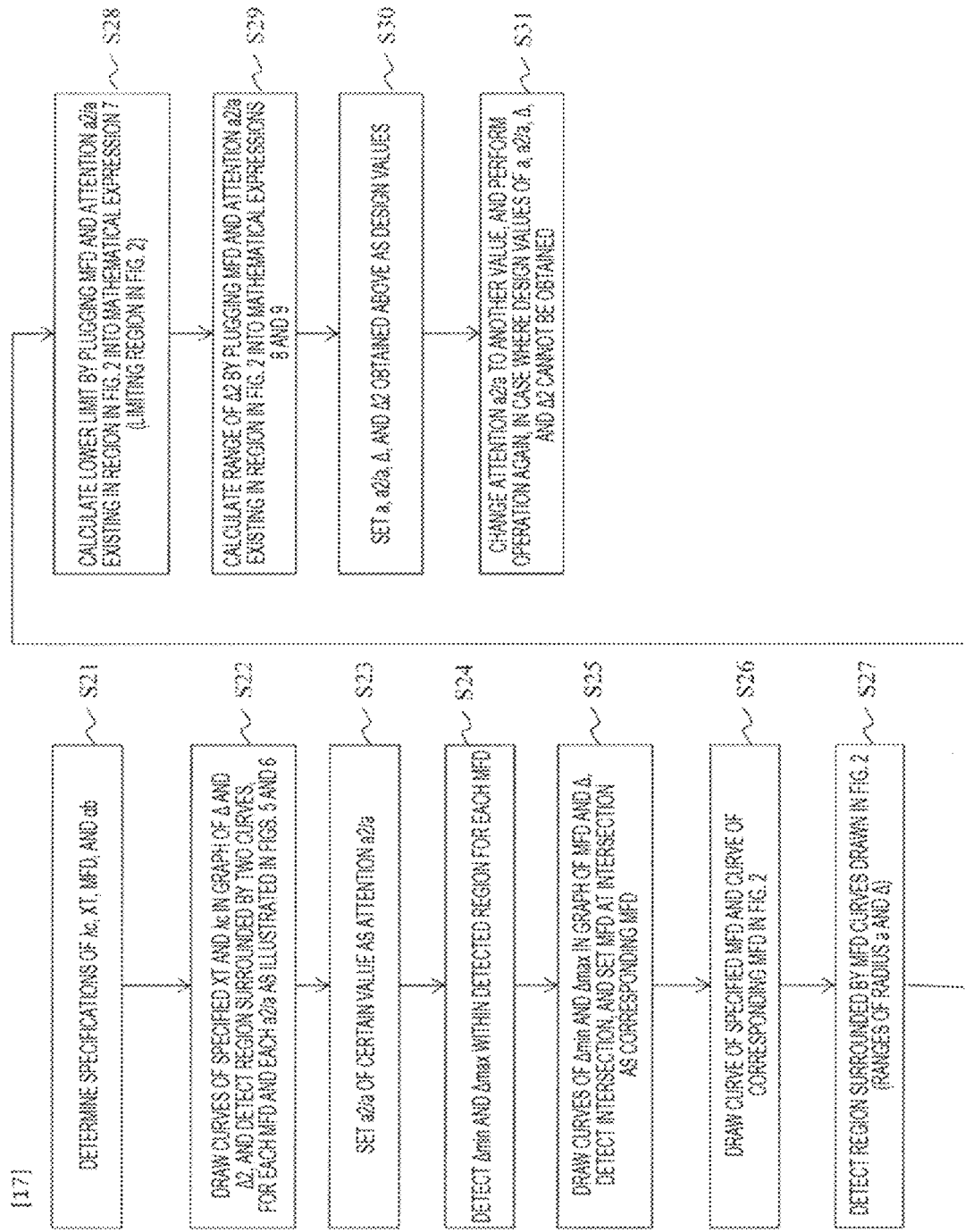

MULTI-CORE OPTICAL FIBER AND DESIGN METHOD

CROSS-REFERENCE TO RELATED APPLICATIONS

This application is a 371 U.S. National Phase of International Application No. PCT/JP2020/030731, filed on Aug. 12, 2020. The entire disclosure of the above application is incorporated herein by reference.

TECHNICAL FIELD

The present disclosure relates to a multi-core optical fiber, and a method for designing the multi-core optical fiber.

BACKGROUND ART

Multi-core fibers (MCF) each having a plurality of core regions have been actively studied for dramatic transmission capacity expansion by a space division multiplexing technology. Particularly, in recent years, MCFs that adopt a standard cladding diameter having high fiber manufacturability and high compatibility with existing standard technologies have attracted attention, and Non Patent Literature 2 discloses that it is possible to dispose four identical cores in a fiber, using a trench-type refractive index distribution with intense optical confinement. Also, standard cladding diameter MCFs that adopt step-index (SI) type refractive index distributions suitable for mass productivity are also suggested in Patent Literature 2 and Non Patent Literature 1. Further, these MCFs guarantee single-mode operations in all communication wavelength bands, like conventional SMFs. However, Patent Literature 1 also discloses an MCF that reduces crosstalk and enables long-distance transmission by limiting the single-mode operation region of each core to the range of 1.530 to 1.625 μm.

Meanwhile, expansion of the single-mode operation band has been discussed to increase the capacity of a transmission system, and inclusion of wavelength regions of 1.53 μm or shorter as transmission wavelength bands has been considered in the discussion of international standardization. Also, utilization of an the S-band (1460 to 1530 nm) has also attracted high interest for further capacity expansion. In addition to that, distributed Raman amplification is used in long-distance transmission. However, to achieve stable amplification characteristics, it is preferable to obtain single-mode operations at wavelengths of Raman excitation light in addition to signal wavelengths.

CITATION LIST

Patent Literature

Patent Literature 1: Japanese Patent No. 6560806

Non Patent Literature

Non Patent Literature 1: T. Matsui, et. al., "Applicability of Step-Index Type Standard Cladding Multi-core Fiber to Full-Band Transmission" in Proc. ECOC, Dublin, Ireland, September 2019, M.1.D.3.
Non Patent Literature 2: T. Matsui, et al., "Design of multi-core fiber in 125 μm cladding diameter with full compliance to conventional SMF," in Proc. ECOC, Valencia, Spain, September 2015, We.4.3.

SUMMARY OF INVENTION

Technical Problem

However, among the standard cladding diameter MCFs that have been studied so far, those of types capable of obtaining single-mode operations in all communication wavelength bands have difficulty in extending the transmission distance due to the limitation of crosstalk. Furthermore, the MCF according to Patent Literature 1 has its single-mode operation region limited, and cannot guarantee single-mode operations at wavelengths of 1.53 μm or shorter. Therefore, the MCF has the above-mentioned difficulty in expanding the transmission wavelength band (expansion to the S-band).

Therefore, to solve the above problems, the present invention aims to provide a multi-core optical fiber that can expand its transmission wavelength band, and extend its transmission distance by reducing crosstalk, and also provide a method for designing the multi-core optical fiber.

Solution to Problem

To achieve the above objective, a multi-core optical fiber according to the present invention has a structure that satisfies the following conditions.

Specifically, a first multi-core optical fiber according to the present invention is a multi-core optical fiber that includes:
four cores that are arranged in a square lattice pattern in a longitudinal direction; and
a cladding region that is formed around the outer peripheral portions of the cores and has a lower refractive index than the cores, the absolute value of the relative refractive index difference between the cores and the cladding region being represented by Δ,
wherein
the diameter of the cladding region is 125±1 μm,
the cutoff wavelength is less than or equal to 1.45 μm,
the mode field diameter MED at a wavelength of 1.55 μm is 9.5 to 10.0 μm,
the bending loss at a wavelength of 1.625 μm and with a bending radius of 30 mm is less than or equal to 0.1 dB/100 turns, and
the inter-core crosstalk at the wavelength of 1.625 μm is less than or equal to −47 dB/km.

The first multi-core optical fiber is characterized in that the shortest distance from the center of the core to the outer periphery of the cladding region is longer than or equal to 33 μm, and the radius $a$ of the core and the relative refractive index difference Δ between the core and the cladding region is within the range expressed by Mathematical Expression C1.

[Mathematical Expression C1]

$$0.0004a^2-0.003a+0.0091 \leq \Delta \leq 0.0005a^2-0.0032a+0.0094, \ \Delta \leq 0.0874a^{-2}, \text{ and } \Delta \geq 0.0101a^{-758} \quad \text{(C1)}$$

Further, a second multi-core optical fiber according to the present invention is a multi-core optical fiber that includes:
four cores that are arranged in a square lattice pattern in a longitudinal direction;
first cladding regions that surround the respective cores; and
a second cladding region that surrounds all of the four first cladding regions, wherein
the refractive index is the highest in the cores, is the second highest in the second cladding region, and is the lowest in the first cladding regions,
the relative refractive index difference between the cores and the first cladding regions is less than or equal to 0.8%,
the ratio between the diameter of the cores and the diameter of the first cladding regions is within the range of 2.0 to 3.0,
the diameter of a cladding region including the first cladding regions and the second cladding region is 125±1 μm,
the cutoff wavelength is less than or equal to 1.45 μm,
the mode field diameter MFD at a wavelength of 1.55 μm is 9.5 to 11.4 μm,
the bending loss at a wavelength of 1.625 μm and with a bending radius of 30 mm is less than or equal to 0.1 dB/100 turns, and
the inter-core crosstalk at the wavelength of 1.625 μm is less than or equal to −54 dB/km.

In the second multi-core optical fiber, the radius a of the cores, the relative refractive index difference Δ between the cores and the first cladding regions, and the relative refractive index difference Δ2 between the cores and the second cladding region satisfy the conditions expressed by Mathematical Expressions C2 to C4.

[Mathematical Expression C2]

$$0.0003a^2-0.0024a+0.0079 \leq \Delta \leq 0.0005a^2-0.0032a+0.0094 \quad (C2)$$

[Mathematical Expression C3]

$$(0.0013MFD^2-0.0296MFD+0.1735)(a_2/a)^2+(-0.0129MFD^2+0.2885MFD-1.6141)(a_2/a)+(0.0419MFD^2-0.9096MFD+4.9388) \leq \Delta \leq -0.0015MFD+0.0223 \quad (C3)$$

[Mathematical Expression C4]

$$(0.0026MFD^2-0.0573MFD+0.31)(a_2/a)^2+(-0.0124MFD^2+0.2683MFD-1.4515)(a_2/a)+(0.0141MFD^2-0.3045MFD+1.6488) \leq \Delta_2 \leq (0.002MFD^2-0.0422MFD+0.2215)(a_2/a)^2+(-0.0098MFD^2+0.205MFD-1.0734)(a_2/a)+(0.012MFD^2-0.2533MFD+1.3312) \quad (C4)$$

Here, $a_2$ represents the radius (μm) of the first claddings, and MFD represents a desired mode field diameter (μm).

Further, a third multi-core optical fiber according to the present invention further includes third cladding regions that are formed in the first cladding regions, have a refractive index substantially equal to the refractive index of the second cladding region, and surround the cores.

Here, the first to third multi-core optical fibers according to the present invention each further include a coating layer that surrounds the cladding region, and the diameter including the coating layer is 200±20 μm.

A method for designing the multi-core optical fiber is a method for designing a multi-core optical fiber that has four cores arranged in a square lattice pattern in a longitudinal direction,
the method including:
calculating a mode field diameter MFD, a cutoff wavelength λc, and a bending loss αb, while changing the radius a of the cores and the absolute value Δ of the relative refractive index difference between the cores and a cladding region, through optical characteristics analysis designed for optical fibers using a finite element method;
drawing curves of a desired mode field diameter MFD, a desired cutoff wavelength λc, and a desired bending loss αb in a graph of the radius a of the cores and the absolute value Δ of the relative refractive index difference; and
setting the radius a of the cores and the absolute value Δ of the relative refractive index difference included in the region surrounded by the curves, as design values of the multi-core optical fiber.

Note that the inventions described above can be combined in any possible manner.

Advantageous Effects of Invention

The present invention can provide a multi-core optical fiber that can expand its transmission wavelength band, and extend its transmission distance by reducing crosstalk, and also provide a method for designing the multi-core optical fiber.

BRIEF DESCRIPTION OF DRAWINGS

FIG. 17 is a flowchart for explaining a design method according to the present invention.

DESCRIPTION OF EMBODIMENTS

Figure 1:
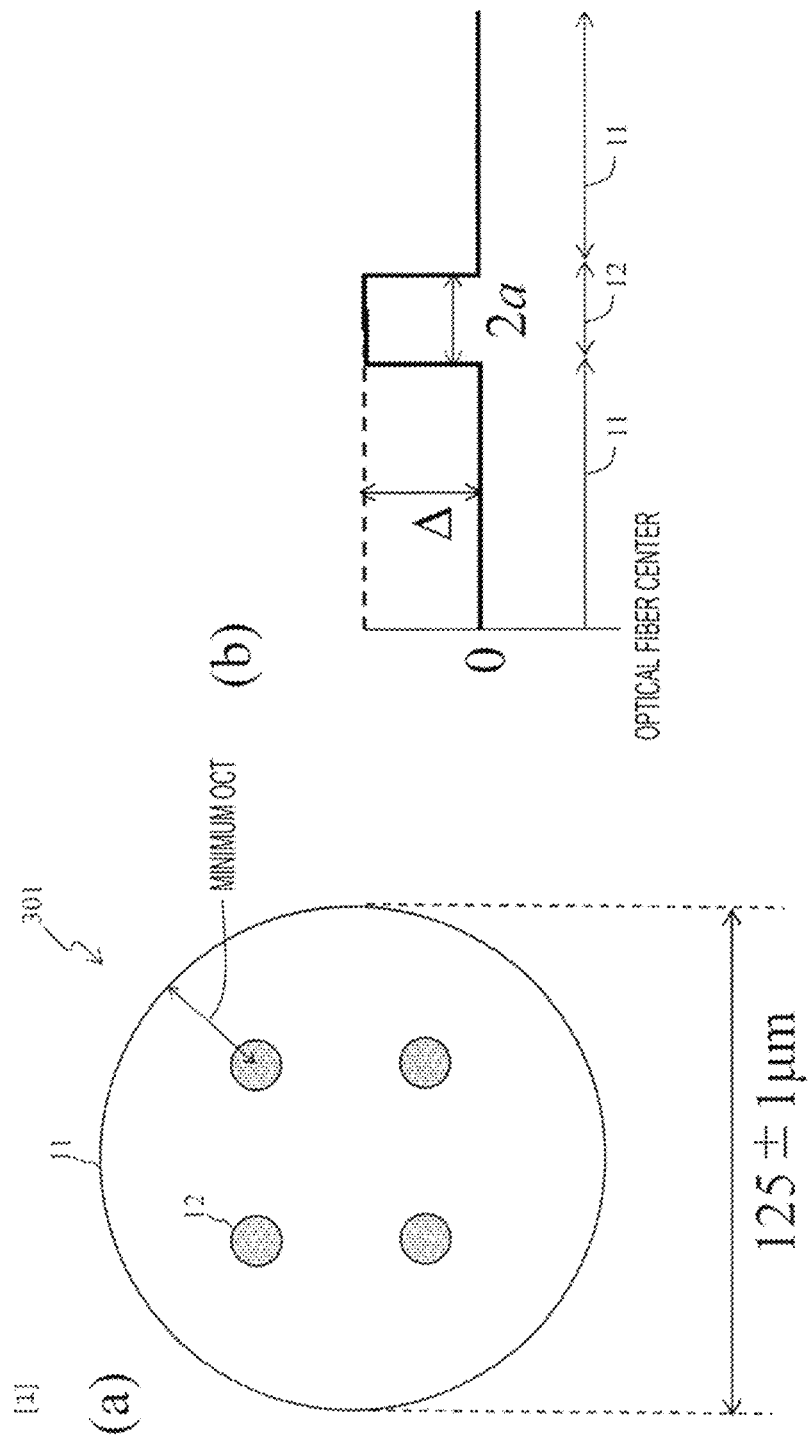
FIG. 1 is a diagram for explaining the structure of a multi-core optical fiber according to the present invention.

Embodiments of the present invention will be described below, with reference to the accompanying drawings. The embodiments described below are examples of the present invention, and the present invention is not limited to these embodiments. Note that like components are denoted by like reference numerals in this specification and the drawings.

First Embodiment

FIG. 1 is a diagram for explaining the structure of a multi-core optical fiber 301 according to this embodiment. FIG. 1 (a) is a cross-sectional view of the multi-core optical fiber 301. FIG. 1 (b) is a diagram for explaining the refractive index distribution near a core of the multi-core optical fiber 301. The multi-core optical fiber 301 is an MCF that has a cladding 11 of 125±1 μm in diameter, and four cores 12. Here, the four cores 12 have substantially the same refractive index distributions, which are of a step index (SI) type or are refractive index distributions equivalent thereto. Here, a represents a core radius, and Δ represents a relative refractive index difference between the cores 12 and the cladding 11. When all the cores 12 have refractive index distributions of the SI type or equivalent to the SI type, the mass productivity and the yield of the multi-core optical fiber 301 can be significantly increased.

Figure 2:
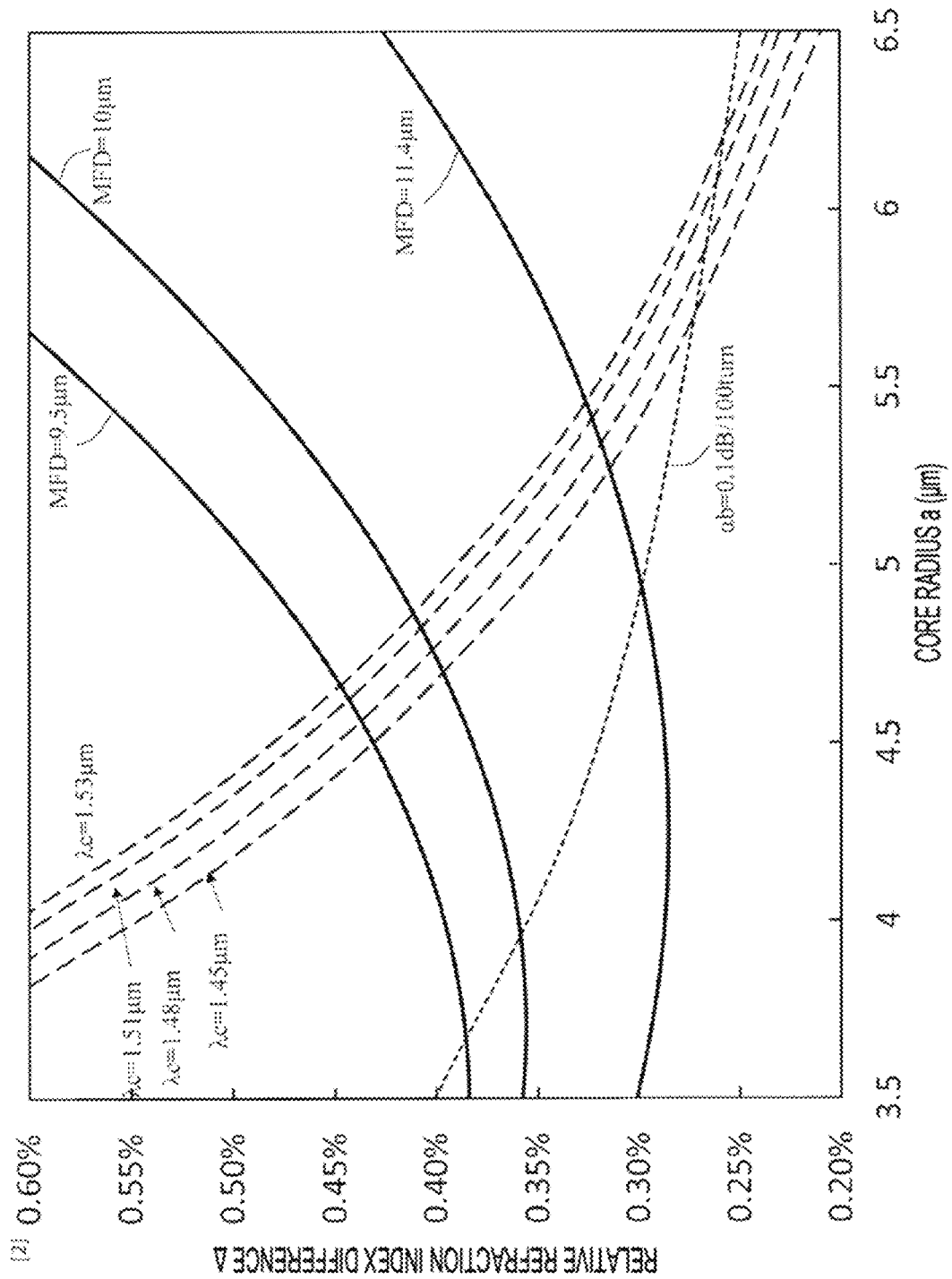
FIG. 2 is a chart for explaining the relationship between structural parameters and optical characteristics of multi-core optical fibers according to the present invention.

FIG. 2 is a characteristics chart illustrating the relationship between structural parameters and optical characteristics of MCFs. In this characteristics chart, the abscissa axis indicates the core radius a, and the ordinate axis indicates the relative refractive index difference Δ.

Solid lines indicate core structures for obtaining predetermined mode field diameters (MFDs). In this chart, structures in which the MFDs at a wavelength of 1.55 μm are 9.5 μm, 10.0 μm, and 11.4 μm are shown.

The dashed lines indicate core structures for obtaining predetermined cutoff wavelengths λc. In this chart, structures in which the cutoff wavelengths λc are 1.45 μm, 1.48 μm, 1.51 μm, and 1.53 μm are shown. The dotted line indicates a core structure for obtaining a predetermined bending loss (ab). In this chart, a structure in which the bending loss λc at a wavelength of 1.625 μm and a bending radius of 30 mm is 0.1 dB/100 turns is shown.

Note that FIG. 2 is a characteristics chart obtained through numerical calculation (optical characteristics analysis of optical fibers, using a finite element method). Specifically, this chart is created by numerically calculating the MFD, the cutoff wavelength λc, and the bending loss ab while changing the MCF core radius a and the relative refractive index difference Δ, and plotting structures having the same value (MFD=9.5 μm, for example) in a graph.

In the case of the SI type, optical characteristics can be uniquely determined once the core structure is determined. For example, to obtain an MCF that has an MED (=9.5 μm [wavelength: 1.55 μm]), a bending loss ab (=0.1 dB/100 turns), and a cutoff wavelength λc of 1.45 μm or shorter, which are equivalent to those of an SMF, the core structure should be designed to have a core radius a and a relative refractive index difference Δ that fall within a region surrounded by the solid lines, the dashed lines, and the dotted line of the respective numerical values in FIG. 2.

Specifically, to obtain an MFD of 9.5 μm or greater at a wavelength of 1.55 μm, the solid line expressed by

[Mathematical Expression 1]

$$\Delta \leq 0.0005a^2 - 0.0032a + 0.0094 \quad (1)$$

is adopted. Also, to set the cutoff wavelength λc to 1.45 μm or shorter, the dashed line expressed by

[Mathematical Expression 2]

$$\Delta \leq 0.0874a^{-2} \quad (2)$$

is adopted. Further, to obtain a bending loss of 0.1 dB/100 turns or smaller at a wavelength of 1.625 μm and a bending radius of 30 mm, the dotted line expressed by

[Mathematical Expression 3]

$$\Delta \geq 0.0101a^{-7.58} \quad (3)$$

is adopted.

Figure 3:
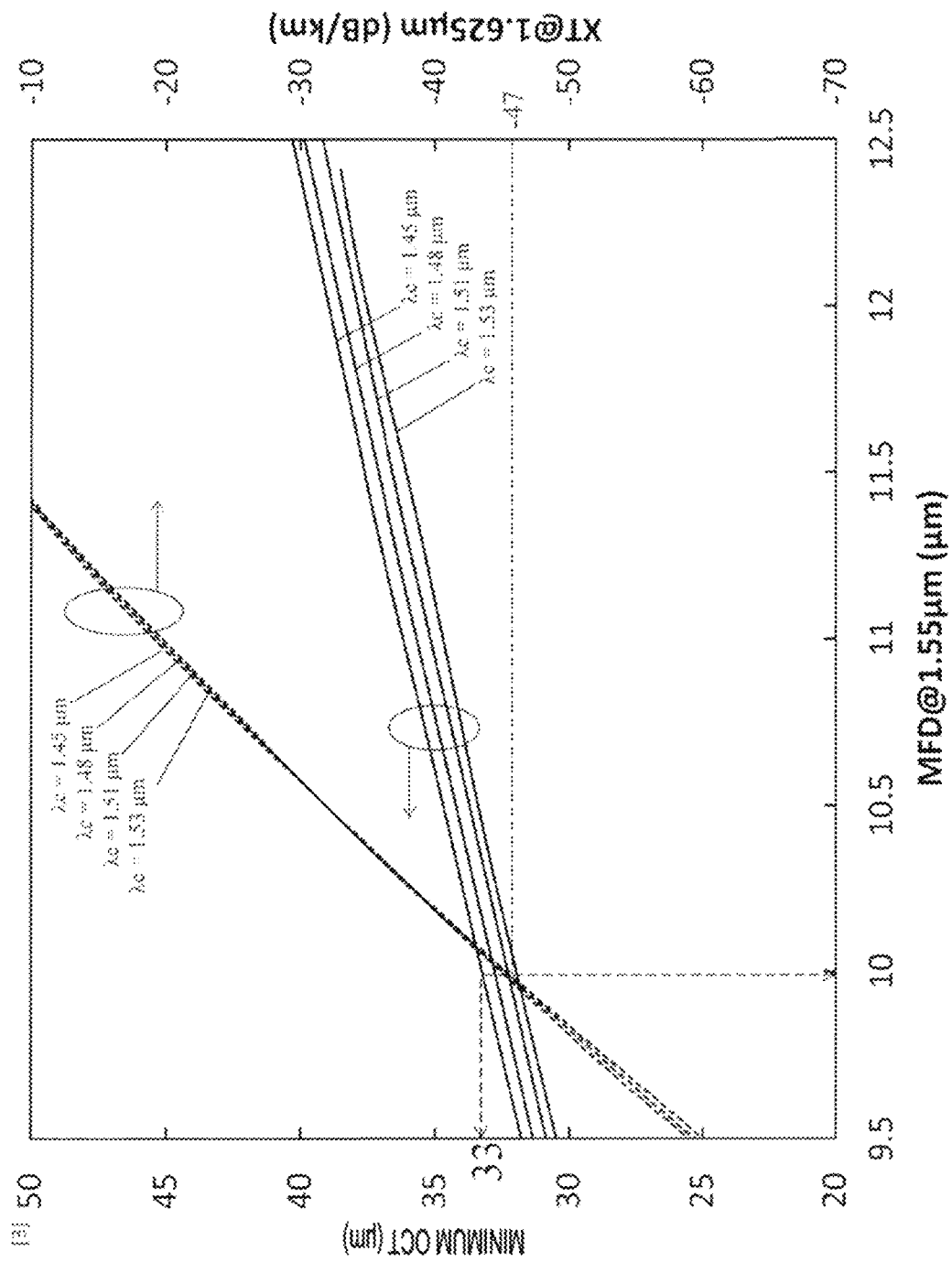
FIG. 3 is a chart for explaining the relationship among the mode field diameter (MFD), the required cladding thickness (minimum OCT), and crosstalk (XT) in a multi-core optical fiber according to the present invention.

Next, a method for detecting the upper limit of MFDs and the required cladding thickness (minimum OCT) is described. The minimum OCT means the shortest distance between the center of the outermost core and the outer periphery of the cladding, where the excessive loss is 0.01 dB/km or smaller at a wavelength of 1.625 μm. FIG. 3 is a diagram for explaining the relationship among the cutoff wavelength λc, the MFD, the minimum OCT, and the crosstalk XT in the multi-core optical fiber 301. Here, the crosstalk XT is the value at a wavelength of 1.625 μm, and the MFD is at a wavelength of 1.55 μm. FIG. 3 is a characteristics chart obtained through numerical calculation (optical characteristics analysis of optical fibers, using a finite element method). Specifically, this chart is created by numerically calculating the crosstalk XT, the minimum OCT, and the cutoff wavelength λc while changing the MFD of the MCF, and plotting structures having the cutoff wavelength λc of the same value (λc=1.45 μm, for example) in a graph.

As can be seen from the solid lines in FIG. 3, the minimum OCT becomes greater, as the MFD becomes greater. As can be seen from the dashed lines in FIG. 3, the XT becomes greater, as the FD becomes greater. On the other hand, where the cutoff wavelength λc is shortened, the minimum OCT becomes greater (solid line), but the XT is substantially constant (dashed line). Here, if a QPSK signal is transmitted 1000 km or greater, the required XT is -47 dB/km. As can be seen from the dashed line in FIG. 3, MFD needs to be 10 μm or smaller (the upper limit MFD=10 μm) in order to set the cutoff wavelength λc to 1.45 μm or shorter at XT=-47 dB/km. Further, from the solid lines in FIG. 3, to set the MFD to 10 μm and the cutoff wavelength λc to 1.45 μm or shorter, it is necessary to set the minimum OCT to 33 μm or greater (the thickness of the cladding 11 from the center of a core 12 to the outer periphery of the MCF is 33 μm or greater).

FIG. 2 also shows a curve (Mathematical Expression 4) having an upper limit MFD=10 μm as calculated from FIG. 3.

[Mathematical Expression 4]

$$\Delta \geq 0.0004a^2 - 0.003a + 0.0091 \quad (4)$$

In FIG. 2, the core radius a and the relative refractive index difference Δ included in the region surrounded by the curve of MFD=9.5 μm, the curve of MED=10 μm, the curve of cutoff wavelength λc=1.45 μm, and the curve of bending loss αb=0.1 dB/100 turns, and the minimum OCT of 33 μm calculated from FIG. 3 are the design values of the multi-core optical fiber 301.

That is, the multi-core optical fiber 301 characteristically includes:
the cladding 11 that has a diameter of 125+1 μm in a cross-section; and
the four cores 12 that are arranged in a square lattice pattern in the cladding in the cross-section, wherein
the shortest distance (minimum OCT) from the center of a core 12 to the outer periphery of the cladding 11 in the cross-section is 33 μm or longer, and
the relationship between the radius a of the cores 12 and the absolute value Δ of the relative refractive index difference between the cores 12 and the cladding 11 satisfies Mathematical Expressions 1 to 4.

Figure 16:
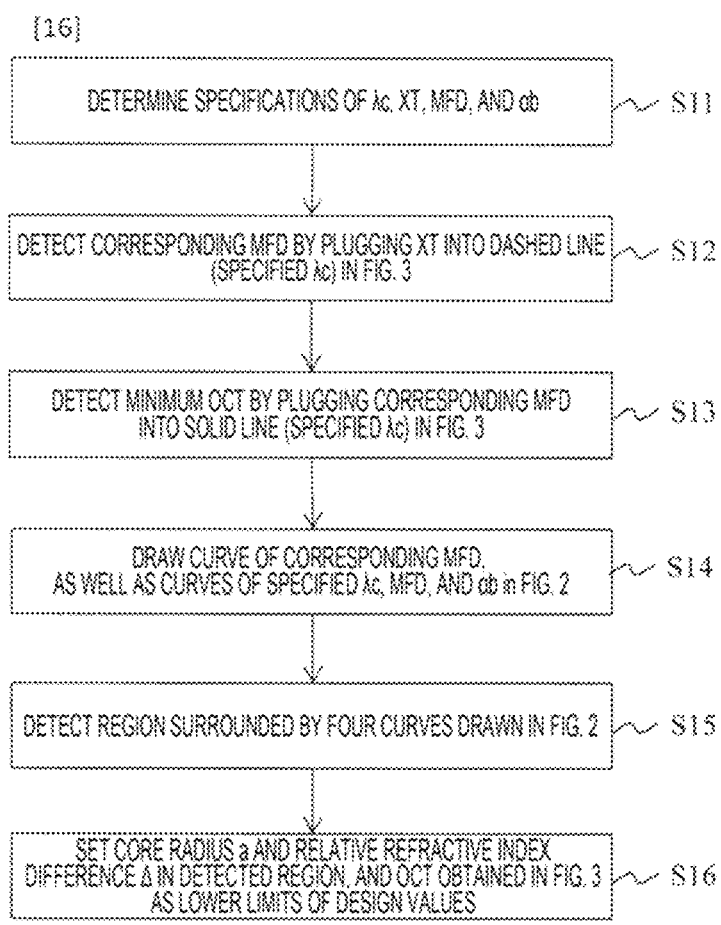
FIG. 16 is a flowchart for explaining a design method according to the present invention.

A method for designing the multi-core optical fiber 301 is as illustrated in FIG. 16. That is, the design method includes:
determining the cutoff wavelength, the upper limit value of crosstalk, the mode field diameter, and the bending loss of the multi-core optical fiber as specification values (step S11);
detecting a corresponding mode field diameter corresponding to the upper limit value of crosstalk of the specification values, from a relationship chart (a second ordinate axis in FIG. 3) between the mode field diameter and the crosstalk at the cutoff wavelength of the specification values (step S12);
detecting the minimum OTC corresponding to the corresponding mode field diameter, from a relationship chart (a first ordinate axis in FIG. 3) between the mode field diameter at the cutoff wavelength of the specification values and the shortest distance (minimum OTC) from the center of the core to the outer periphery of the cladding in a cross-section of the multi-core optical fiber (step S13);
drawing a first curve satisfying the mode field diameter among the specification values, a second curve satisfying the cutoff wavelength among the specification values, a third curve satisfying the bending loss among the specification values, and a fourth curve satisfying the corresponding mode field diameter in an optical characteristics chart (FIG. 2) of the radius a of the core and the absolute value Δ of the relative refractive index difference between the core and the cladding (step S14);
detecting the radius a of the core and the absolute value Δ of the relative refractive index difference included in the region surrounded by the first curve, the second curve, the third curve, and the fourth curve in the optical characteristics chart (step S15); and
setting the detected minimum OTC, radius a of the core, and absolute value Δ of the relative refractive index difference as design values of the multi-core optical fiber (step S16).

Second Embodiment

Figure 4:
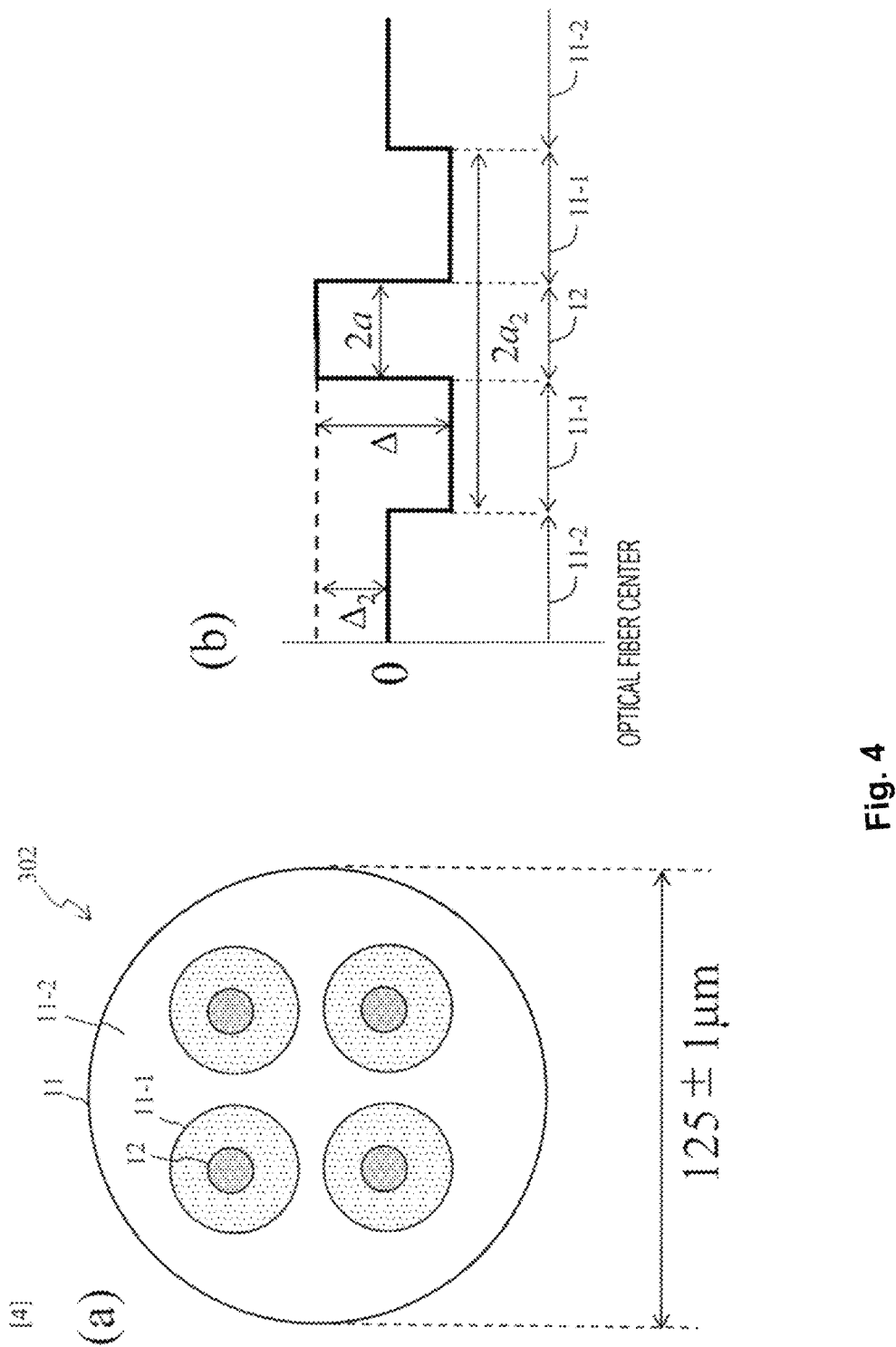
FIG. 4 is a diagram for explaining the structure of a multi-core optical fiber according to the present invention.

FIG. 4 is a diagram for explaining the structure of a multi-core optical fiber 302 according to this embodiment. FIG. 4 (a) is a cross-sectional view of the multi-core optical fiber 302. FIG. 4 (b) is a diagram for explaining the refractive index distribution near a core of the multi-core optical fiber 302. The cladding diameter and the number of cores of the multi-core optical fiber 302 are 125+1 μm and four cores, which are the same as those of the multi-core optical fiber 301 in FIG. 1, and the respective cores have substantially the same refractive index distributions.

The multi-core optical fiber 302 includes the cores 12, first cladding regions 11-1 surrounding the cores 12, and a second cladding region 11-2 surrounding the first cladding regions 11-1, and the refractive index becomes lower in the order of the cores 12, the second cladding region 11-2, and the first cladding regions 11-1. With such a structure, control on optical confinement can be enhanced, and the range of MED and the transmission distance illustrated in FIG. 3 can be improved.

Figure 5:
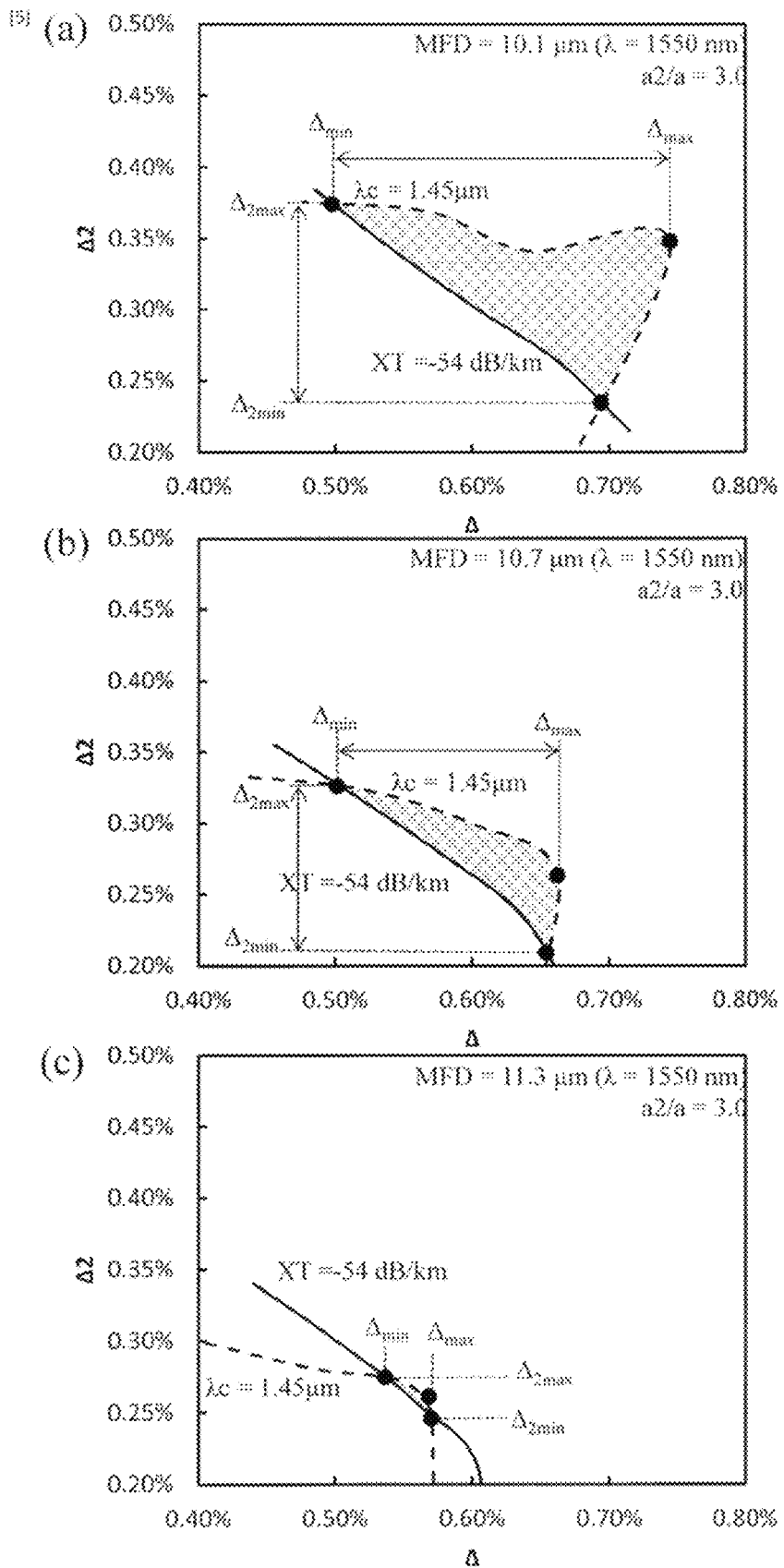
FIG. 5 is charts for explaining the structural conditions for a multi-core optical fiber according to the present invention.

FIG. 5 shows an example of the structural conditions for obtaining a predetermined MFD, cutoff wavelength, and XT in the multi-core optical fiber 302. FIG. 5 is characteristics charts obtained through numerical calculation (optical characteristics analysis of optical fibers, using a finite element method). Specifically, these charts are created by numerically calculating a relative refractive index difference 42, the crosstalk XT, and the cutoff wavelength λc while changing the relative refractive index difference Δ of the MCF for each MED, and plotting structures having the same cutoff wavelength (λc=1.45 μm) and the same crosstalk (XT=−54 dB/km) in a graph. In FIGS. 5(a) to 5(c), MED at a wavelength of 1.55 μm is set to 10.1 μm, 10.7 μm, and 11.3 μm, respectively, and a2/a is calculated as 3.0 in each case.

The cutoff wavelength λc can be set to 1.45 μm or shorter in the region closer to the origin than the dashed line in FIG. 5. Further, the core position (the position in a radial direction from the center of the MCF) is set so that the excessive loss is 0.01 dB/km or less at a wavelength of 1.625 μm. In the region on the opposite side of the origin from the solid line in FIG. 5, the XT at a wavelength of 1.625 μm is -54 dB/km or less. Under this crosstalk XT condition, the signal format can be extended up to 16 QAM with a transmission distance of 1000 km, and the transmission distance can be extended up to about 5000 km with a QPSK signal.

As can be seen from FIGS. 5(a) to 5(c), the structural conditions for obtaining the cutoff wavelength of 1.45 μm or shorter are that an upper limit value Δmax (the maximum value of the dashed line with respect to the abscissa axis) of the relative refractive index difference Δ is set for each MED, and the upper limit value Δmax decreases with increase in MED.

Further, the lower limit value Δmin of the relative refractive index difference Δ and the range of the relative refractive index difference Δ2 (Δ2max-Δ2min) for achieving the crosstalk XT of −54 dB/km or less are determined from the intersection of the solid line and the dashed line.

That is, it is safe to say that FIG. 5 is charts for explaining the ranges of the relative refractive index differences Δ and Δ2 for achieving the cutoff wavelength λc of 1.45 μm or shorter and the crosstalk XT of −54 dB/km or less with each MED.

Figure 6:
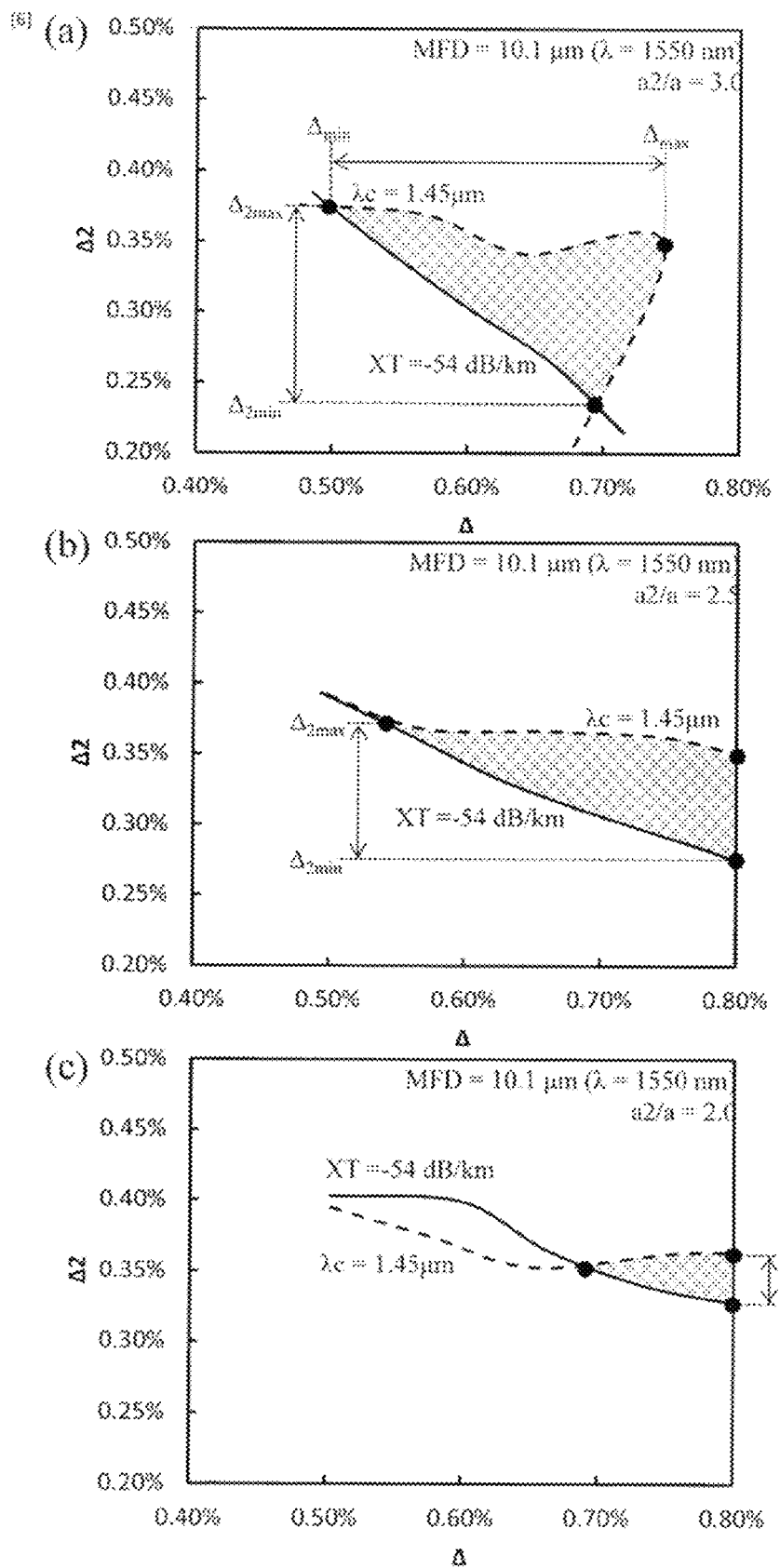
FIG. 6 is charts for explaining the structural conditions for a multi-core optical fiber according to the present invention.

FIG. 6 also shows an example of the structural conditions for obtaining a predetermined MED, cutoff wavelength, and XT in the multi-core optical fiber 302. FIG. 6 is also characteristics charts obtained through numerical calculation (optical characteristics analysis of optical fibers, using a finite element method). Specifically, these charts are created by numerically calculating a relative refractive index difference 42, the crosstalk XT, and the cutoff wavelength λc while changing the relative refractive index difference Δ of the MCF for each MFD, and plotting structures having the same cutoff wavelength (λc=1.45 μm) and the same crosstalk (XT=−54 dB/km) in a graph. In FIGS. 6(a) to 6(c), a2/a is set to 3.0, 2.5, and 2.0, respectively, and MED at a wavelength of 1.55 µm is calculated to be 10.1 µm. Note that FIG. 6(a) shows the same contents as FIG. 5(a).

Here, the maximum value of the relative refractive index difference Δ on the ordinate axis is 0.8%. This is because it is normally difficult to lower the refractive index of the cladding by 0.8% or more with respect to the refractive index of the core, in a case where the core is formed with pure quartz glass. Here, as illustrated in FIGS. 6(b) and 6(c), Δmax is 0.8% or greater when a2/a is 2 or 2.5. However, there is little point in appealing the Δ of 0.8% or greater for the above reason, and is not shown in these drawings.

As illustrated in FIGS. 6(a) to 6(c), Δmin becomes greater, as a2/a is made smaller. On the other hand, it is apparent that the range of the relative refractive index difference Δ2 (Δ2max-Δ2min) decreases.

The following can be seen from FIGS. 5 and 6.

((1) Δmax is determined from the structural condition of $a_2/a=3.0$ (a2/a=2.5 or 2.0 is meaningless, because the value exceeds 0.8%).

((2) The ranges of Δmin and Δ2 can be defined as functions of $a_2/a$ and MED.

Figure 7:
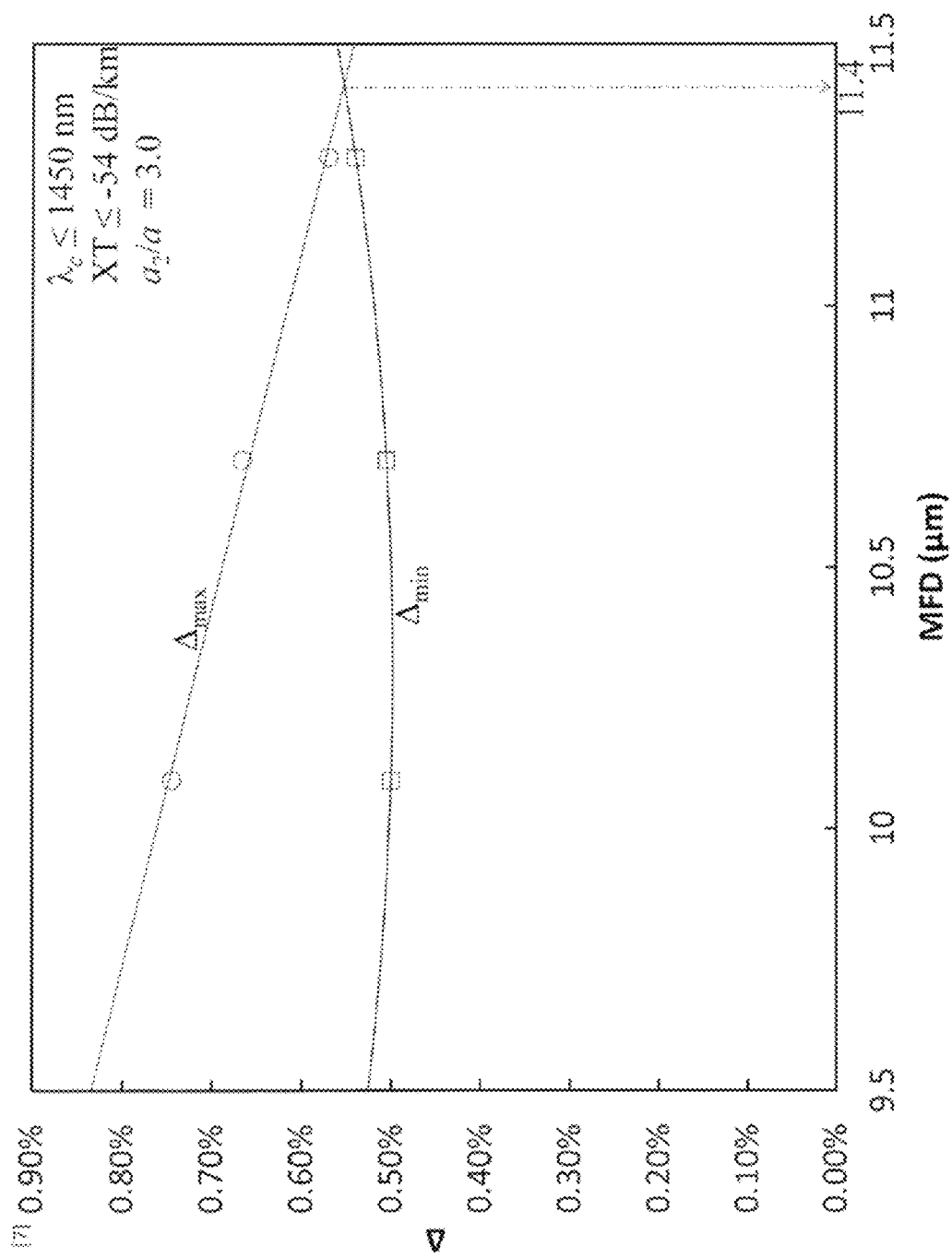
FIG. 7 is a chart for explaining the structural conditions for a multi-core optical fiber according to the present invention.

FIG. 7 is a chart for explaining the relationship between MFD of the multi-core optical fiber 302 and the range of 4. Here, a2/a=3.0, with the above (1) being taken into consideration. The upper limit value (Δmax) and the lower limit value (Δmin) of Δ shown in FIG. 5 are expressed by functions of MED at a wavelength of 1.55 µm. As shown in FIG. 7, Δmax decreases linearly with respect to MED as in the expression shown below.

[Mathematical Expression 5]

$$\Delta \leq -0.0015 MFD + 0.0223 \quad (6)$$

The maximum MFD that satisfies λc of 1.45 µm or shorter, and XT of −54 dB/km or less (the conditions described above with reference to FIG. 5) is MED=11.4 µm, which is the intersection of Δmax and Δmin. FIG. 2 also shows the curve (Mathematical Expression 6) of the maximum MFD.

[Mathematical Expression 6]

$$\Delta \geq 0.0003 a^2 - 0.0024 a + 0.0079 \quad (6)$$

In the MCF structure in FIG. 4, the shape of the electrical field distribution (MDF) is dominantly determined by the radius a of the cores 12 and the relative refractive index difference Δ between the cores 12 and the first claddings 11-1. Accordingly, the conditions for the radius a of the cores 12 and the relative refractive index difference Δ can be found from FIG. 2.

That is, in a case where a2/a=3.0, the core radius a and the relative refractive index difference Δ included in the region surrounded by the curve of MFD=9.5 µm and the curve of MFD=11.4 µm in FIG. 2 are design values of the multi-core optical fiber 302 calculated from MDF. Note that, in the MCF structure in FIG. 4, the cutoff wavelength λc and the bending loss ab vary with the relative refractive index difference 42, and therefore, the dashed lines and the dotted line in FIG. 2 are not taken into consideration.

Hereinafter, the ranges of the core radius a and the relative refractive index difference Δ calculated from FIG. 2 are limited as follows.

((a) The upper limit value Δmax of the relative refractive index difference Δ

Mathematical Expression 5 expresses the variation of Δmax with respect to MED when a2/a=3.0, and another expression is satisfied in a case where a2/a has a different value. However, as can be determined from FIGS. 5 and 6, when a2/a is smaller than 3.0, Δmax becomes greater and exceeds 0.8%. As described above, a structure in which A exceeds 0.8% is not realistic. Therefore, if Mathematical Expression 5 (the straight line in FIG. 7) in a case where a2/a=3.0 is defined as the upper limit value of 4, the result of Mathematical Expression 5 can be used even when a2/a has a different value.

((b) The lower limit value Δmin of the relative refractive index difference Δ

As illustrated in FIG. 6, Δmin becomes greater, as a2/a becomes smaller than 3.0. That is, as for Δmin, when a2/a is smaller than 3.0, the curve shown in FIG. 7 rises. Therefore, the result of Mathematical Expression 5 cannot be used in a case where a2/a has a different value (the curve of Δmin varies for each value of $a_2/a$).

Figure 8:
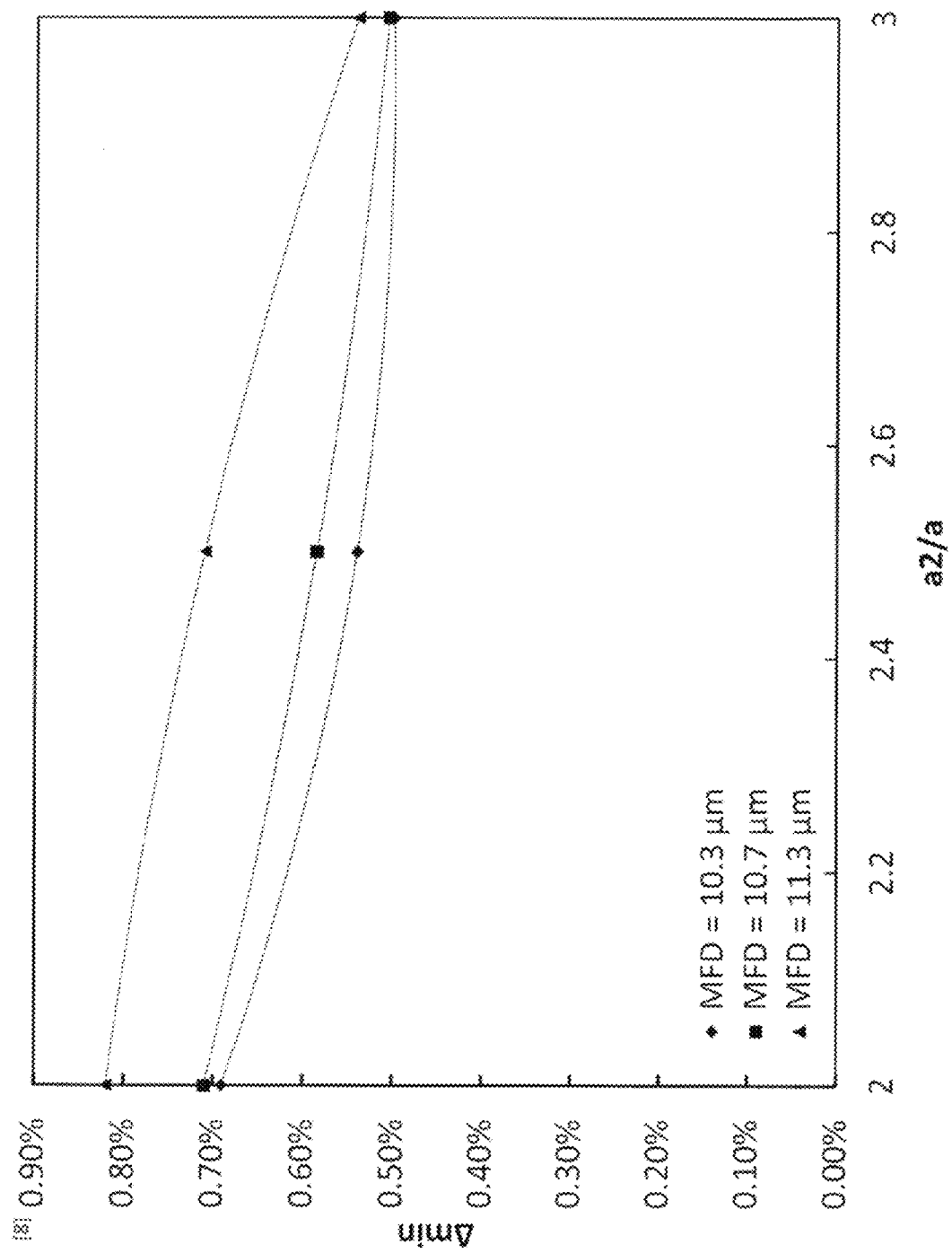
FIG. 8 is a chart for explaining the structural conditions for a multi-core optical fiber according to the present invention.

FIG. 8 is a chart for explaining that the curve of Δmin (a curve in FIG. 7) varies with each value of $a_2/a$. Specifically, FIG. 8 is a chart illustrating the variation of Δmin with respect to a2/a of the multi-core optical fiber 302 for each MFD at a wavelength of 1.55 µm. As illustrated in FIGS. 5 and 6, Δmin varies with a2/a and MFD. Here, the variation of Δmin is expressed by functions of a2/a and MED from FIG. 8.

Figure 9:
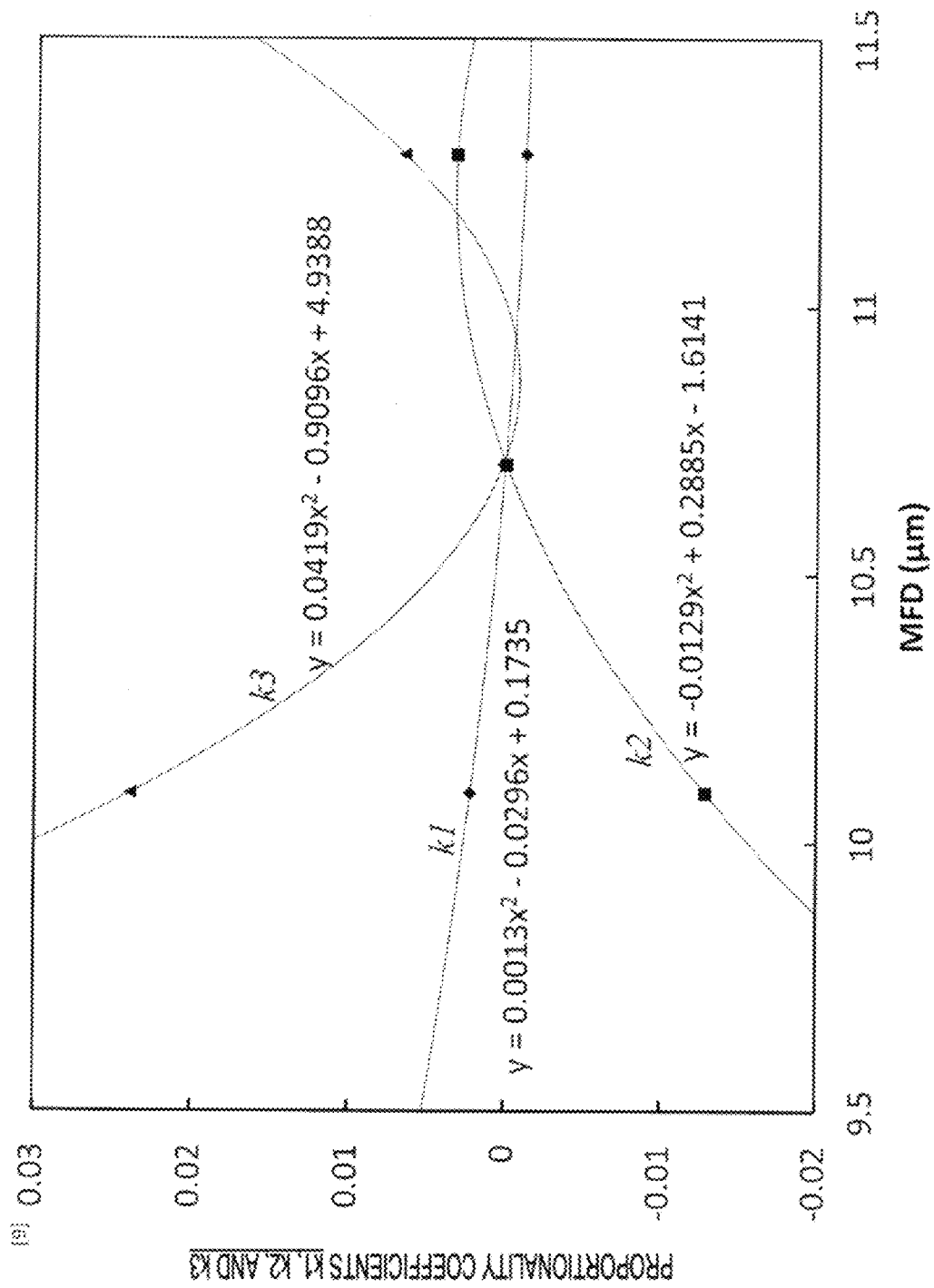
FIG. 9 is a chart for explaining the structural conditions for a multi-core optical fiber according to the present invention.

FIG. 9 illustrates the respective coefficients (k1, k2, and k3) expressed by functions of MFD in a case where the relationship between a2/a and Δmin shown in FIG. 8 is approximated by a quadratic function ($k1x^2+k2x+k3$; x being a2/a). From these results, the lower limit Δmin of Δ is calculated according to the expression shown below.

[Mathematical Expression 7]

$$\Delta \geq (0.0013 MFD^2 - 0.0296 MFD) + 0.1735)(a_2/a)^2 + (-0.0129 MFD^2 + 0.2885 MFD - 1.6141)(a_2/a) + (0.0419 MFD^2 - 0.9096 MFD + 4.9388) \quad (7)$$

That is, the curve of Δmin in FIG. 7 varies with a2/a. The maximum value of MFD (which is 11.4 when a2/a=3.0) also varies with a2/a.

Further, the multi-core optical fiber 302 also has the parameter of Δ2.

(c) The Upper Limit Value Δ2Max of the Relative Refractive Index Difference Δ2

Figure 10:
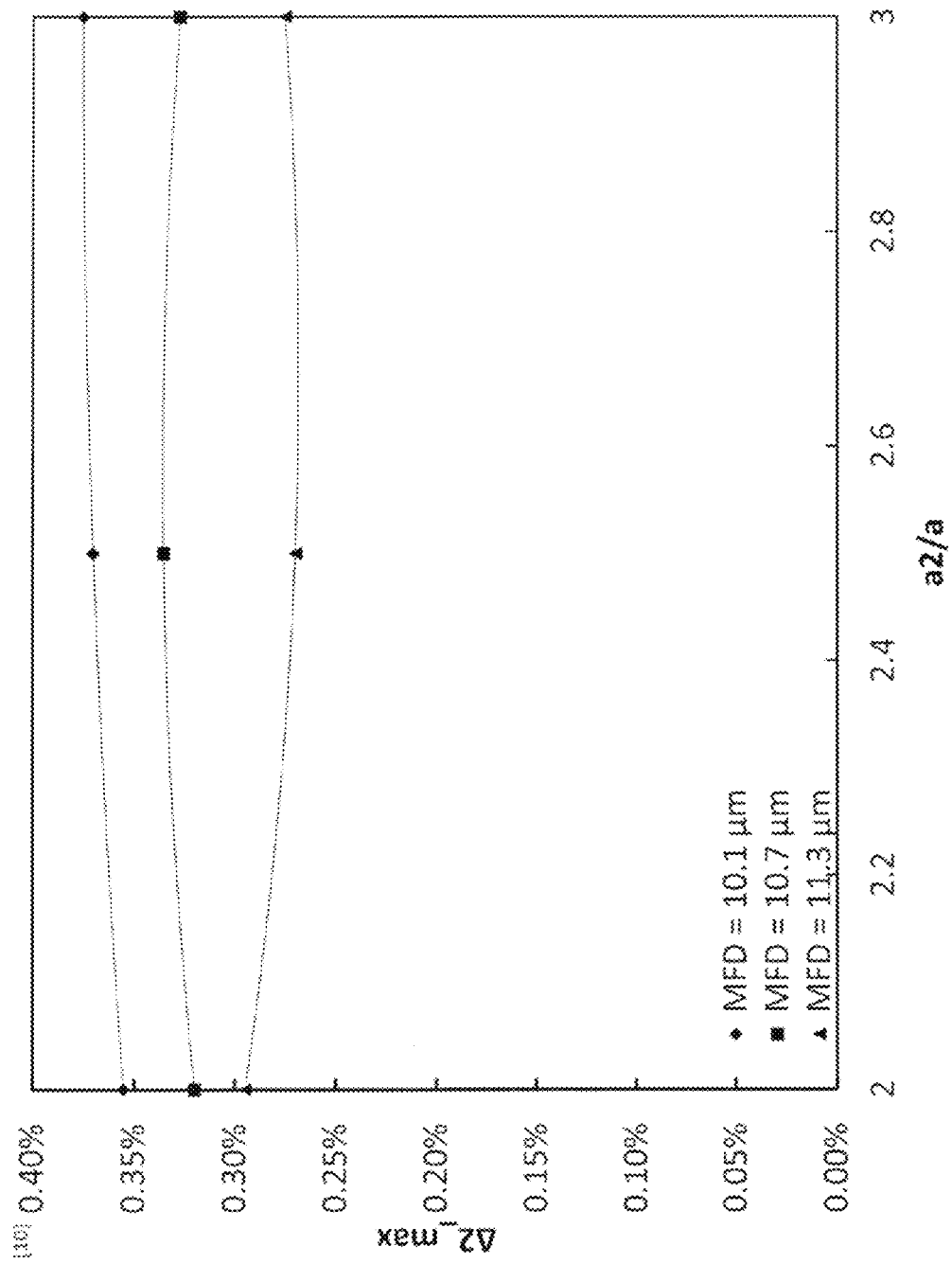
FIG. 10 is a chart for explaining the structural conditions for a multi-core optical fiber according to the present invention.

FIG. 10 is a chart for explaining that Δ2max varies with each value of $a_2/a$ (Δ2max varies among FIGS. 6(a) to 6(c)). Specifically, FIG. 10 is a chart illustrating the variation of Δ2max with respect to a2/a of the multi-core optical fiber 302 for each MED at a wavelength of 1.55 µm. As illustrated in FIGS. 5 and 6, Δ2_max varies with a2/a and MFD. Here, the variation of Δ2max is expressed by functions of $a_2/a$ and MED from FIG. 10.

Figure 11:
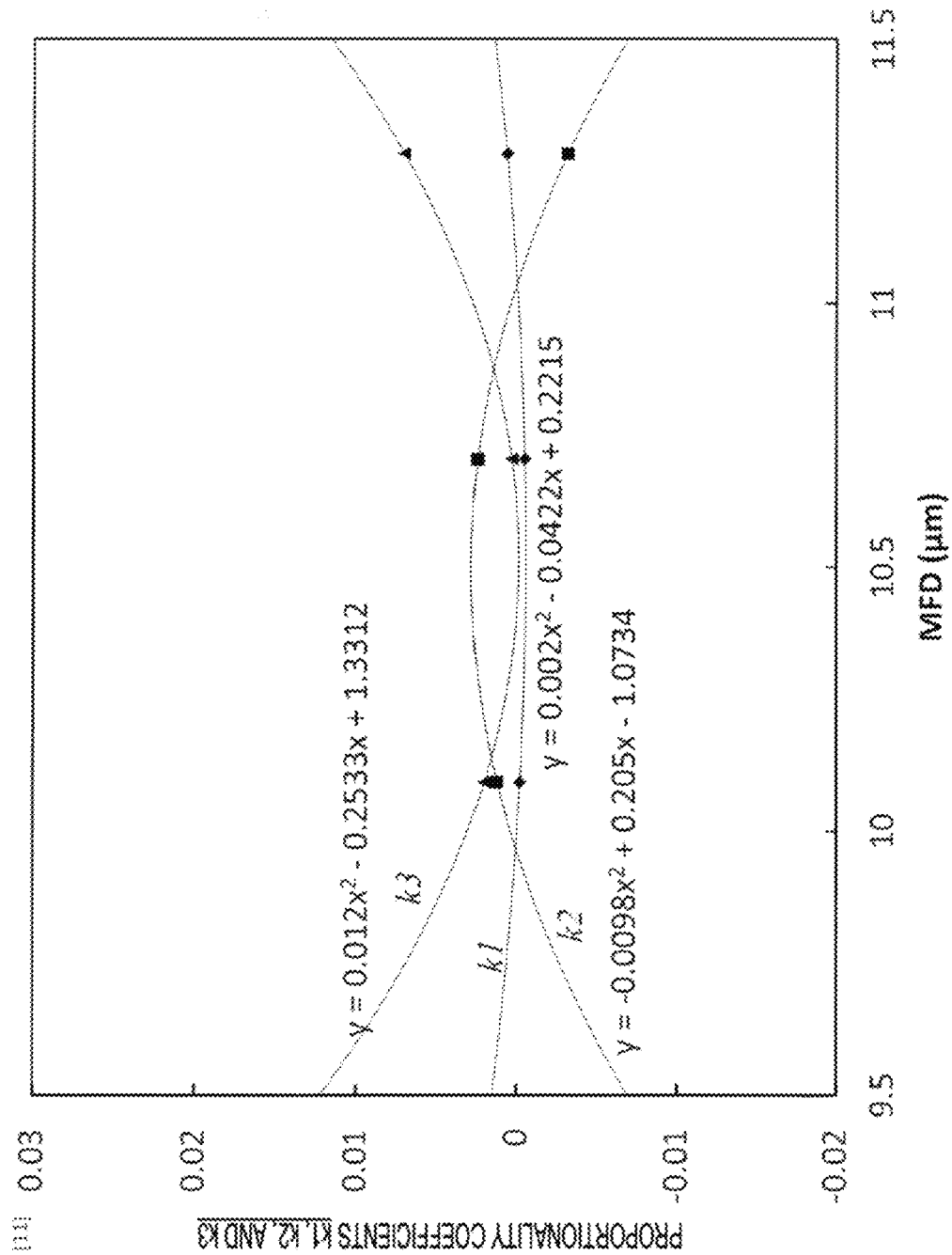
FIG. 11 is a chart for explaining the structural conditions for a multi-core optical fiber according to the present invention.

FIG. 11 illustrates the respective coefficients (k1, k2, and k3) expressed by functions of MFD in a case where the relationship between a2/a and Δ2max shown in FIG. 10 is approximated by a quadratic function ($k1x^2+k2x+k3$; x being a2/a). From these results, the upper limit Δ2max of Δ2 is calculated according to the expression shown below.

[Mathematical Expression 8]

$$\Delta_2 \leq (0.002 MFD^2 - 0.0422 MFD + 0.2215)(a_2/a)^2 + (-0.0098 MFD^2 + 0.205 MFD - 1.0734)(a_2/a) + (0.012 MFD^2 - 0.2533 MFD + 1.3312) \quad (8)$$

(d) The Lower Limit Value Δ2 Min of the Relative Refractive Index Difference Δ2

Figure 12:
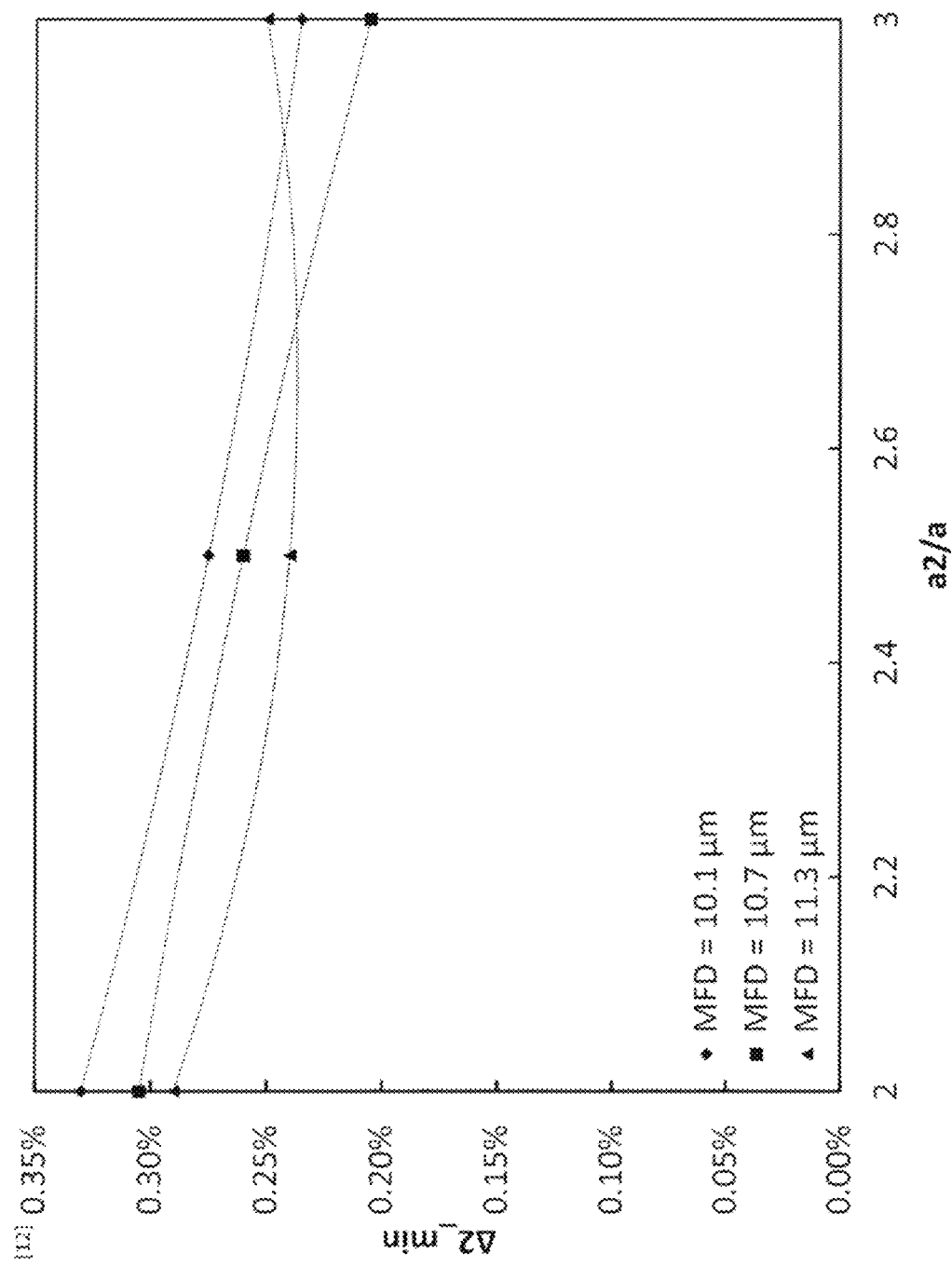
FIG. 12 is a chart for explaining the structural conditions for a multi-core optical fiber according to the present invention.

FIG. 12 is a chart for explaining that Δ2 min varies with each value of $a_2/a$ (Δ2min varies among FIGS. 6(a) to 6(c)). Specifically, FIG. 12 is a chart illustrating the variation of Δ2 min with respect to a2/a of the multi-core optical fiber 302 for each MFD at a wavelength of 1.55 µm. As illustrated in FIGS. 5 and 6, Δ2min varies with a2/a and MFD. Here, the variation of Δ2min is expressed by functions of a2/a and MED from FIG. 12.

Figure 13:
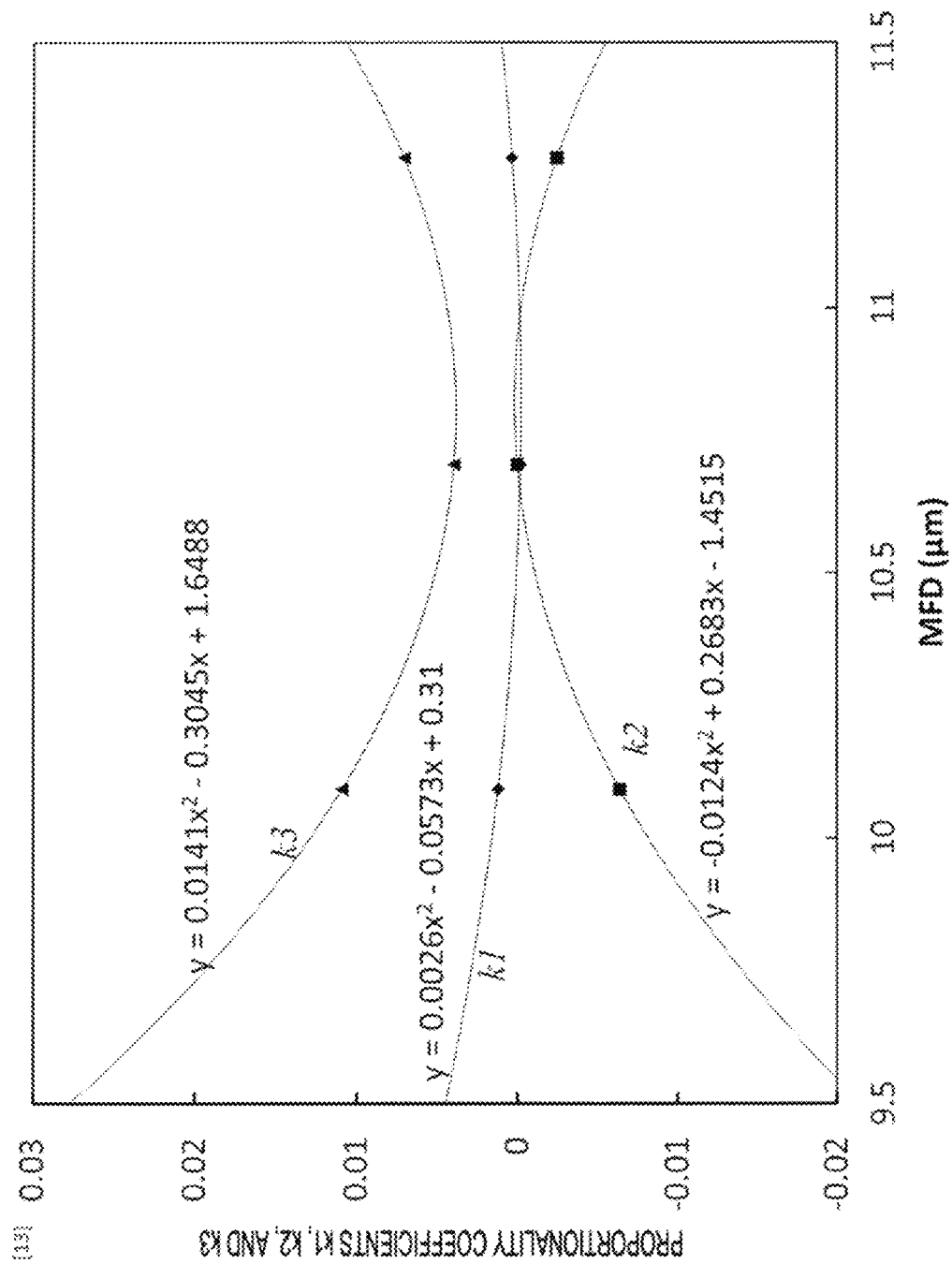
FIG. 13 is a chart for explaining the structural conditions for a multi-core optical fiber according to the present invention.

FIG. 13 illustrates the respective coefficients (k1, k2, and k3) expressed by functions of MED in a case where the relationship between a2/a and Δ2 min shown in FIG. 12 is approximated by a quadratic function (k1$x^2$+k2$x$+k3; x being a2/a). From these results, the lower limit Δ2 min of Δ2 is calculated according to the expression shown below.

[Mathematical Expression 9]

$$\Delta_2 \leq (0.0026MFD^2-0.0573MFD+0.31)(a_2/a)^2+(-0.0124MFD^2+0.2683MFD-1.4515)(a^2/a)+(0.0141MFD^2-0.3045MFD+1.6488) \quad (9)$$

As described above, in the structure of the multi-core optical fiber 302, the cutoff wave λc (dashed lines) and the bending loss ab (dotted line) are not taken into consideration in FIG. 2, but the range of the relative refractive index difference 42 is limited according to Mathematical Expression 8 and Mathematical Expression 9, and the cutoff wavelength λc is 1.45 µm or shorter.

That is, the multi-core optical fiber 302 characteristically includes:
the cladding 11 that has a diameter of 125+1 µm in a cross-section; and
the four cores 12 that are arranged in a square lattice pattern in the cladding 11 in the cross-section, wherein
the cladding 11 includes first claddings 11-1 surrounding the respective cores 12, and a second cladding 11-2 containing all the first claddings 11-1,
the refractive index is the highest in the cores 12, and is the lowest in the first claddings 11-1,
the relationship between the radius a (µm) of the cores 12 and the absolute value Δ of the relative refractive index difference between the cores 12 and the first claddings 11-1 satisfies Mathematical Expression C2,
the absolute value Δ of the relative refractive index difference satisfies Mathematical Expression C3, and
the absolute value Δ2 of the relative refractive index difference between the second cladding 11-2 and the cores 12 satisfies Mathematical Expression C4.

[Mathematical Expression C2]

$$0.0003a^2-0.0024a+0.0079 \leq \Delta \leq 0.0005a^2-0.0032a+0.0094 \quad (C2)$$

[Mathematical Expression C3]

$$(0.0013MFD^2-0.0296MFD+0.1735)(a_2/a)^2+(-0.0129MFD^2+0.2885MFD-1.6141)(a_2/a)+(0.0419MFD^2-0.9096MPD+4.9388) \leq \Delta \leq -0.0015MFD+0.0223 \quad (C3)$$

[Mathematical Expression C4]

$$(0.0026MFD^2-0.0573MFD+0.31)(a_2/a)^2+(-0.0124MFD^2+0.2683MFD-1.4515)(a_2/a)+(0.0141MFD^2-0.3045MFD+1.6488) \leq \Delta_2 \leq (0.002MFD^2-0.0422MFD+0.2215)(a_2/a)^2+(-0.0098MFD^2+0.205MFD-1.0734)(a_2/a)+(0.012MFD^2-0.2533MFD+1.3312) \quad (C4)$$

Here, a2 represents the radius (µm) of the first claddings 11-1, and MED represents a desired mode field diameter (µm).

A method for designing the multi-core optical fiber 302 is as illustrated in FIG. 17. That is, the design method includes:
determining the cutoff wavelength λc, the upper limit value of crosstalk XT, the mode field diameter MFD, and the bending loss ab of the multi-core optical fiber 302 as specification values (step S21);
drawing a region having a wavelength shorter than the cutoff wavelength of the specification values and crosstalk equal to or smaller than the upper limit value of the crosstalk of the specification values in a relationship chart (FIGS. 5 and 6) of the absolute value Δ of the relative refractive index difference between the cores and the first claddings, the absolute value Δ2 of the relative refractive index difference between the cores and the second cladding, the mode field diameter MFD, and the ratio (a2/a) between the radius a of the cores and the radius a2 of the first claddings (step S22);
detecting the maximum value Δmax and the minimum value Δmin of the absolute value of the relative refractive index difference between the cores and the first claddings included in the region in which the ratio (a2/a) between the radius of the cores and the radius of the first claddings has a provisionally determined value (steps S23 and S24; as for Δmin, the relational expression between MED and a2/a can be expressed by Mathematical Expression 7);
drawing the variation curves of Δmax and Δmin with respect to changes in MED in a graph of MFD and Δ, and detecting the corresponding MFD when the variation curves intersect (step S25);
drawing a first curve satisfying the mode field diameter of the specification values and a second curve satisfying the corresponding mode field diameter in an optical characteristics chart of the radius a of the cores and the absolute value Δ of the relative refractive index difference between the cores and the claddings (step S26);
detecting the radius a of the cores and the absolute value Δ of the relative refractive index difference included in the region surrounded by the first curve and the second curve in the optical characteristics chart (step S27);
calculating the range of the absolute value Δ of the relative refractive index difference satisfying Mathematical Expression C3 among the absolute values Δ of the relative refractive index differences included in the region surrounded by the first curve and the second curve (step S28);
calculating the range of the absolute value Δ2 of the relative refractive index difference between the second cladding and the cores by plugging the absolute value & of the relative refractive index difference included in the region surrounded by the first curve and the second curve, and the provisionally determined ratio (a2/a) into Mathematical Expression C4 (step S29); and
setting the detected radius a of the cores, ratio (a2/a), absolute value Δ of the relative refractive index difference, and absolute value Δ2 of the relative refractive index difference between the second cladding and the cores, as design values of the multi-core optical fiber (step S30).

Note that, in a case where design values are not obtained in step S30, a2/a is changed, and the operation is then repeated starting from step S23.

Third Embodiment

Figure 14:
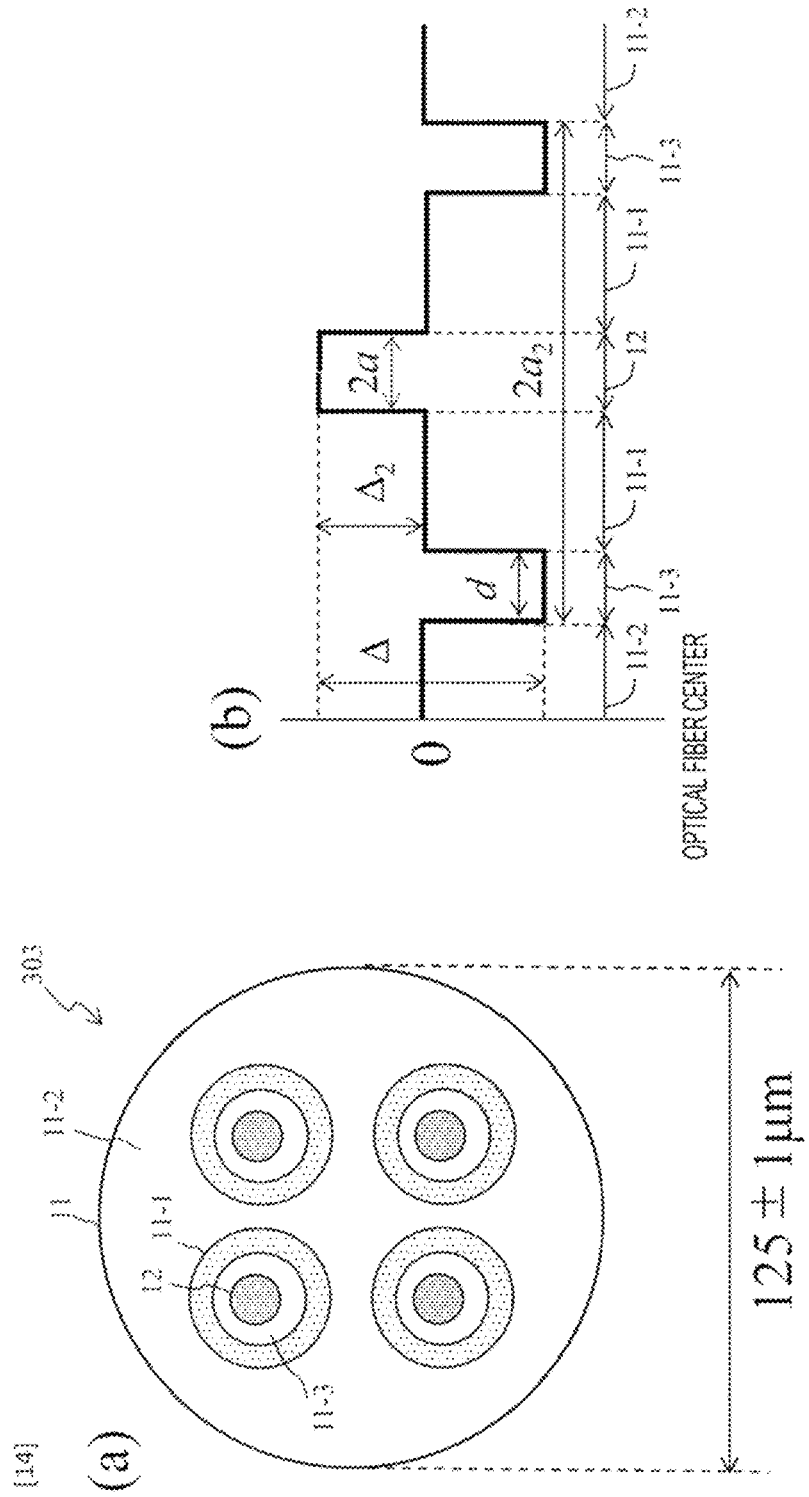
FIG. 14 is a diagram for explaining the structure of a multi-core optical fiber according to the present invention.

FIG. 14 is a diagram for explaining the structure of a multi-core optical fiber 303 according to this embodiment.

FIG. 14 (a) is a cross-sectional view of the multi-core optical fiber 303. FIG. 14 (b) is a diagram for explaining the refractive index distribution near a core of the multi-core optical fiber 303. The cladding diameter and the number of cores of the multi-core optical fiber 303 are 125+1 μm and four cores, which are the same as those of the multi-core optical fiber 301 in FIG. 1, and the respective cores have substantially the same refractive index distributions.

The multi-core optical fiber 303 includes cores 12, third cladding regions 11-3 surrounding the cores 12, first cladding regions 11-1 surrounding the third cladding regions 11-3, and a second cladding region 11-2 surrounding the first cladding regions 11-1. The refractive index becomes lower in the order of the cores 12, the second cladding region 11-2, and the first cladding regions 11-1. The refractive index of the third cladding regions 11-3 is the same as the refractive index of the second cladding region 11-2.

In the multi-core optical fiber 303, the refractive index of the cladding is higher than that of the multi-core optical fiber 302, and the number of parameters is larger. Accordingly, the multi-core optical fiber 303 can increase MED and reduce XT by larger amounts than the multi-core optical fiber 302. At this stage, if the ranges of a, a2, Δ, and Δ2 are designed as described in the second embodiment, the same optical characteristics as those of the second embodiment can be achieved, which is preferable.

Fourth Embodiment

Figure 15:
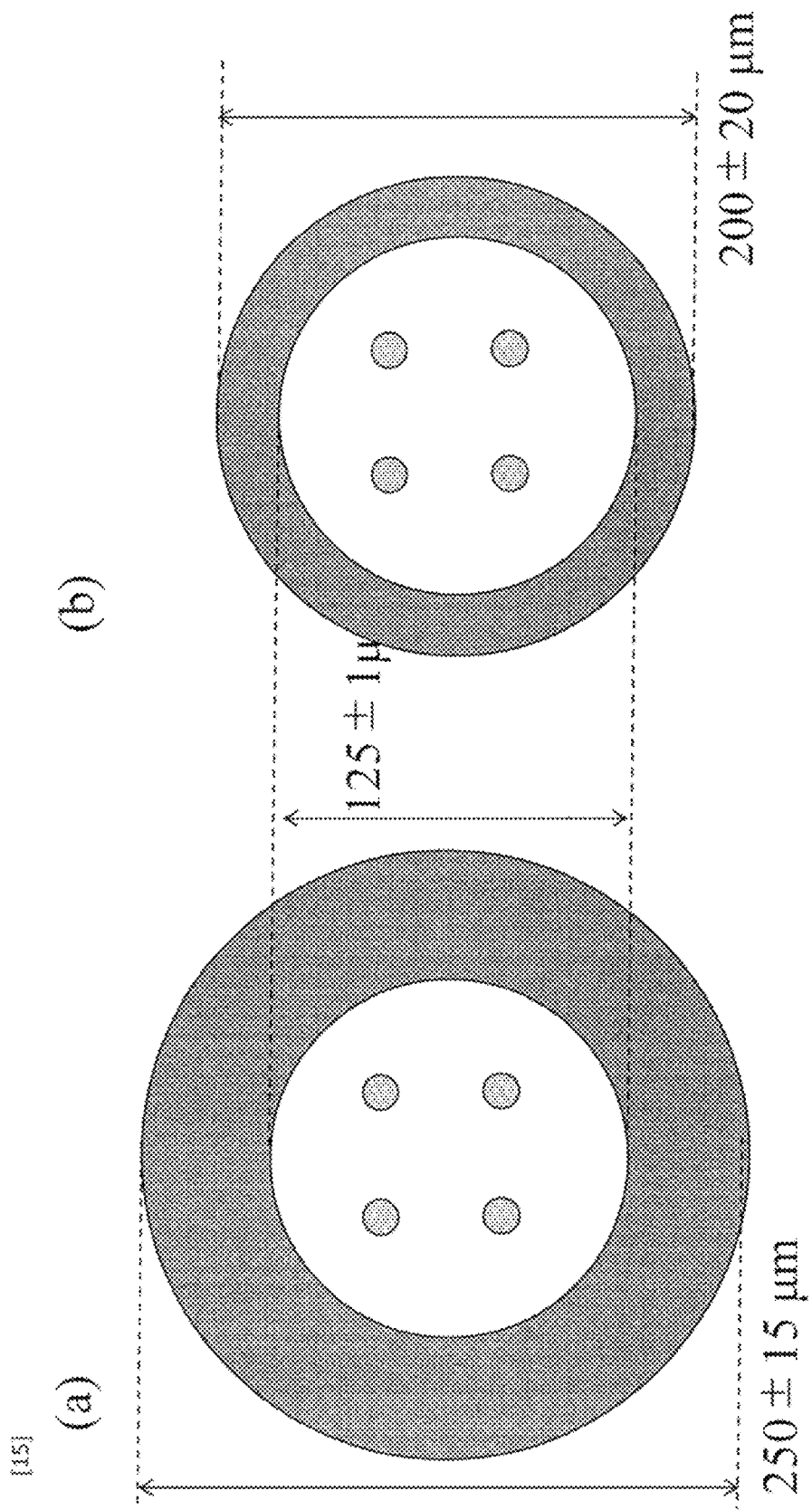
FIG. 15 is a diagram for explaining the structure of a multi-core optical fiber according to the present invention.

FIG. 15 is a diagram for comparing cross-sectional structures of multi-core optical fibers. Normally, an optical fiber has a coating layer formed with resin or the like around glass (a cladding), so as to ensure mechanical reliability. FIG. 15(a) is a diagram for explaining a standard multi-core optical fiber that includes the coating layer and has a diameter of 250+15 μm. FIG. 15(b) is a diagram for explaining a multi-core optical fiber that includes the coating layer and has a diameter of 200+20 μm. It is known that mechanical reliability and loss characteristics can be maintained even in a case where the diameter including the coating layer is 200 #20 μm. In the multi-core optical fibers (301 to 303) described above, the diameter including the coating layer is set to 200+20 μm. Thus, a multi-core optical fiber having a smaller diameter can be mounted on an optical cable, and an optical cable with a high density and a large number of cores can be formed, which is preferable.

[Supplementary Notes]

The point of the present invention is that predetermined conditions are set for the refractive index distribution and the core position in an MCF of a standard cladding diameter, to expand the single-mode band and reduce crosstalk XT at the same time. Specific multi-core optical fibers of the present invention are as follows.

A first multi-core optical fiber is a multi-core optical fiber that has the structure illustrated in FIG. 1, and characteristically includes:

a cladding that has a diameter of 125+1 μm in a cross-section; and four cores that are arranged in a square lattice pattern in the cladding in the cross-section, wherein the shortest distance from the center of the core to the outer periphery of the cladding in the cross-section is 33 μm or longer, and the relationship between the radius a (μm) of the core and the absolute value Δ of the relative refractive index difference between the core and the cladding satisfies Mathematical Expression C1.

[Mathematical Expression C1]

$$0.0004a^2 - 0.003a + 0.0091 \leq \Delta \leq 0.0005a^2 - 0.0032a + 0.0094,\ \Delta \leq 0.0874a^{-2},\ \text{and}\ \Delta \geq 0.0101a^{-758} \quad (C1)$$

Meanwhile, a method for designing the first multi-core optical fiber includes:

determining the cutoff wavelength, the upper limit value of crosstalk, the mode field diameter, and the bending loss of the multi-core optical fiber as specification values;

detecting a corresponding mode field diameter corresponding to the upper limit value of crosstalk of the specification values, from a relationship chart (a second ordinate axis in FIG. 3) between the mode field diameter and the crosstalk at the cutoff wavelength of the specification values;

detecting the minimum OTC corresponding to the corresponding mode field diameter, from a relationship chart (a first ordinate axis in FIG. 3) between the mode field diameter at the cutoff wavelength of the specification values and the shortest distance (minimum OTC) from the center of the core to the outer periphery of the cladding in a cross-section of the multi-core optical fiber;

drawing a first curve satisfying the mode field diameter among the specification values, a second curve satisfying the cutoff wavelength among the specification values, a third curve satisfying the bending loss of the specification values, and a fourth curve satisfying the corresponding mode field diameter in an optical characteristics chart (the graph in FIG. 2) of the radius a of the core and the absolute value Δ of the relative refractive index difference between the core and the cladding;

detecting the radius a of the core and the absolute value Δ of the relative refractive index difference included in the region surrounded by the first curve, the second curve, the third curve, and the fourth curve in the optical characteristics chart; and setting the detected minimum OTC, radius a of the core, and absolute value Δ of the relative refractive index difference as design values of the multi-core optical fiber.

Further, a second multi-core optical fiber is a multi-core optical fiber that has the structure illustrated in FIG. 4, and characteristically includes:

a cladding that has a diameter of 125+1 μm in a cross-section; and four cores that are arranged in a square lattice pattern in the cladding in the cross-section, wherein the cladding includes first claddings surrounding the respective cores, and a second cladding containing all the first claddings, the refractive index is the highest in the cores, and is the lowest in the first claddings, the relationship between the radius a (μm) of the cores and the absolute value Δ of the relative refractive index difference between the cores and the first claddings satisfies Mathematical Expression C2, the absolute value Δ of the relative refractive index difference satisfies Mathematical Expression C3, and the absolute value Δ2 of the relative refractive index difference between the second cladding and the cores satisfies Mathematical Expression C4.

[Mathematical Expression C2]

$$0.0003a^2-0.0024a+0.0079 \leq \Delta \leq 0.0005a^2-0.0032a+0.0094 \quad (C2)$$

[Mathematical Expression C3]

$$(0.0013MFD^2-0.0296MFD+0.1735)(a_2/a)^2+(-0.0129MFD^2+0.2885MFD-1.6141)(a_2/a)+(0.0419MFD^2-0.9096MFD+4.9388) \leq \Delta \leq -0.0015MFD+0.0223 \quad (C3)$$

[Mathematical Expression C4]

$$(0.0026MFD^2-0.0573MFD+0.31)(a_2/a)^2+(-0.0124MFD^2+0.2683MFD-1.4515)(a_2/a)+(0.0141MFD^2-0.3045MFD+1.6488) \leq \Delta_2 \leq (0.002MFD^2-0.0422MFD+0.2215)(a_2/a)^2+(-0.0098MFD^2+0.205MFD-1.0734)(a_2/a)+(0.012MFD^2-0.2533MFD+1.3312) \quad (C4)$$

Here, a2 represents the radius (μm) of the first claddings, and MFD represents a desired mode field diameter (μm).

Further, a method for designing the second multi-core optical fiber includes:

determining the cutoff wavelength, the upper limit value of crosstalk, the mode field diameter, and the bending loss of the multi-core optical fiber as specification values;

drawing a region having a wavelength shorter than the cutoff wavelength of the specification values and crosstalk equal to or smaller than the upper limit value of the crosstalk of the specification values in a relationship chart (FIGS. 5 and 6) of the absolute value Δ of the relative refractive index difference between the cores and the first claddings, the absolute value Δ2 of the relative refractive index difference between the cores and the second cladding, the mode field diameter MFD, and the ratio (a2/a) between the radius a of the cores and the radius a2 of the first claddings;

detecting the maximum value Δmax and the minimum value Δmin of the absolute value of the relative refractive index difference between the cores and the first claddings included in the region in which the ratio (a2/a) between the radius of the cores and the radius of the first claddings has a provisionally determined value (as for Δmin, the relational expression between MED and a2/a can be expressed by Mathematical Expression 7);

drawing variation curves of Δmax and Δmin with respect to changes in MFD in a graph of MED and 4, and detecting the corresponding MFD when the variation curves intersect;

drawing a first curve satisfying the mode field diameter of the specification values and a second curve satisfying the corresponding mode field diameter in an optical characteristics chart of the radius a of the cores and the absolute value Δ of the relative refractive index difference between the cores and the claddings;

detecting the radius a of the cores and the absolute value Δ of the relative refractive index difference included in the region surrounded by the first curve and the second curve in the optical characteristics chart;

calculating the range of the absolute value Δ of the relative refractive index difference satisfying Mathematical Expression C3 among the absolute values & of the relative refractive index differences included in the region surrounded by the first curve and the second curve;

calculating the range of the absolute value Δ2 of the relative refractive index difference between the second cladding and the cores by plugging the absolute value & of the relative refractive index difference included in the region surrounded by the first curve and the second curve, and the provisionally determined ratio (a2/a) into Mathematical Expression 9; and setting the detected radius a of the cores, ratio (a2/a), absolute value Δ of the relative refractive index difference, and absolute value Δ2 of the relative refractive index difference between the second cladding and the cores, as design values of the multi-core optical fiber.

[Mathematical Expression C3]

$$(0.0013MFD^2-0.0296MFD+0.1735)(a_2/a)^2+(-0.0129MFD^2+0.2885MFD-1.6141)(a_2/a)+(0.0419MFD^2-0.9096MFD+4.9388) \leq \Delta \leq -0.0015MFD+0.0223 \quad (C3)$$

[Mathematical Expression C4]

$$(0.0026MFD^2-0.0573MFD+0.31)(a_2/a)^2+(-0.0124MFD^2+0.2683MFD-1.4515)(a^2/a)+(0.0141MFD^2-0.3045MFD+1.6488) \leq \Delta_2 \leq (0.002MFD^2-0.0422MFD+0.2215)(a_2/a)^2+(-0.0098MFD^2+0.205MFD)-1.0734)(a_2/a)+(0.012MFD^2-0.2533MFD+1.3312) \quad (C4)$$

Here, a2 represents the radius (μm) of the first claddings, and MED represents a desired mode field diameter (μm).

(Effects)

The present invention can achieve low XT, while expanding the single-mode wavelength band to the S-band, for an MCF having a standard cladding diameter.

REFERENCE SIGNS LIST

11 cladding
11-1 first cladding
11-2 second cladding
11-3 third cladding
12 core
301 to 303 multi-core optical fiber

The invention claimed is:

1. A multi-core optical fiber comprising:
    four cores that are arranged in a square lattice pattern in a longitudinal direction; and
    a cladding region that is formed around outer peripheral portions of the cores and has a lower refractive index than the cores, an absolute value of a relative refractive index difference between the cores and the cladding region being represented by A,
    wherein
    a diameter of the cladding region is 125±1 μm,
    a cutoff wavelength is less than or equal to 1.45 μm,
    a mode field diameter MFD at a wavelength of 1.55 μm is 9.5 to 10.0 μm,
    a bending loss at a wavelength of 1.625 μm and with a bending radius of 30 mm is less than or equal to 0.1 dB/100 turns, and
    inter-core crosstalk at the wavelength of 1.625 μm is less than or equal to −47 dB/km.

2. The multi-core optical fiber according to claim 1, wherein a shortest distance from a center of each of the four cores to an outer periphery of the cladding region is longer than or equal to 33 μm, and a radius a of each of the four cores and the relative refractive index difference Δ between each of the four cores and the cladding region is within a range expressed by Mathematical Expression C1:

[Mathematical Expression C1]

$$0.0004a^2-0.003a+0.0091 \leq \Delta \leq 0.0005a^2-0.0032a+0.0094, \Delta \leq 0.0874a^{-2}, \text{ and } \Delta \geq 0.0101a^{-.758} \quad (C1).$$

3. The multi-core optical fiber according to claim 1, further comprising
a coating layer that surrounds the cladding region,
wherein a diameter including the coating layer is 200±20 µm.

4. A multi-core optical fiber comprising:
four cores that are arranged in a square lattice pattern in a longitudinal direction;
first cladding regions that surround the respective cores; and
a second cladding region that surrounds all of the four first cladding regions,
wherein
a refractive index is the highest in the cores, is the second highest in the second cladding region, and is the lowest in the first cladding regions, a relative refractive index difference between the cores and the first cladding regions is less than or equal to 0.8%, a ratio between a diameter of the cores and a diameter of the first cladding regions is within a range of 2.0 to 3.0,
a diameter of a cladding region including the first cladding regions and the second cladding region is 125±1 µm,
a cutoff wavelength is less than or equal to 1.45 µm,
a mode field diameter MFD at a wavelength of 1.55 µm is 9.5 to 11.4 µm,
a bending loss at a wavelength of 1.625 µm and with a bending radius of 30 mm is less than or equal to 0.1 dB/100 turns, and
inter-core crosstalk at the wavelength of 1.625 µm is less than or equal to −54 dB/km.

5. The multi-core optical fiber according to claim 4, wherein a radius a of the cores, a relative refractive index difference Δ between the cores and the first cladding regions, and a relative refractive index difference Δ2 between the cores and the second cladding region satisfy conditions expressed by Mathematical Expressions C2 to C4:

[Mathematical Expression C2]

$$0.0003a^2-0.0024a+0.0079 \leq \Delta \leq 0.0005a^2-0.0032a+0.0094 \quad (C2)$$

[Mathematical Expression C3]

$$(0.0013MFD^2-0.0296MFD+0.1735)(a_2/a)^2+(-0.0129MFD^2+0.2885MFD-1.6141)(a_2/a)+(0.0419MFD^2-0.9096MFD+4.9388) \leq \Delta \leq -0.0015MFD+0.0223 \quad (C3)$$

[Mathematical Expression C4]

$$(0.0026MFD^2-0.0573MFD+0.31)(a_2/a)^2+(-0.0124MFD^2+0.2683MFD-1.4515)(a_2/a)+(0.0141MFD^2-0.3045MFD+1.6488) \leq \Delta_2 \leq (0.002MFD^2-0.0422MFD+0.2215)(a_2/a)^2+(-0.0098MFD^2+0.205MFD-1.0734)(a_2/a)+(0.012MFD^2-0.2533MFD+1.3312) \quad (C4)$$

where, a2 represents a radius (µm) of the first cladding, and MFD represents a desired mode field diameter (µm).

6. The multi-core optical fiber according to claim 4, further comprising third cladding regions that are formed in the first cladding regions, have a refractive index substantially equal to a refractive index of the second cladding region, and surround the cores.

7. The multi-core optical fiber according to claim 4, further comprising
a coating layer that surrounds the cladding region,
wherein a diameter including the coating layer is 200±20 µm.

* * * * *